US012410753B2

(12) United States Patent
Niergarth et al.

(10) Patent No.: US 12,410,753 B2
(45) Date of Patent: *Sep. 9, 2025

(54) GAS TURBINE ENGINE

(71) Applicant: General Electric Company, Schenectady, NY (US)

(72) Inventors: Daniel Alan Niergarth, Norwood, OH (US); Jeffrey Donald Clements, Mason, OH (US); Jeffrey S. Spruill, Hillsboro, OH (US); Erich Alois Krammer, West Chester, OH (US); Matthew Kenneth MacDonald, Austin, TX (US); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,515

(22) Filed: Oct. 5, 2023

(65) Prior Publication Data

US 2024/0218828 A1 Jul. 4, 2024

Related U.S. Application Data

(63) Continuation-in-part of application No. 17/978,629, filed on Nov. 1, 2022, now abandoned.

(51) Int. Cl.
*F02C 7/00* (2006.01)
*F02C 7/18* (2006.01)
*F02K 3/077* (2006.01)

(52) U.S. Cl.
CPC .............. *F02C 7/185* (2013.01); *F02K 3/077* (2013.01); *F05D 2260/213* (2013.01)

(58) Field of Classification Search
CPC ..... F02C 7/185; F05D 2260/213; F02K 3/077
See application file for complete search history.

(56) References Cited

U.S. PATENT DOCUMENTS 2,264,297 A 12/1941 Clay
2,623,721 A 12/1952 Harrington
(Continued)

FOREIGN PATENT DOCUMENTS

| CN | 1603596 A | 4/2005 |
|----|-----------|--------|
| CN | 101576024 A | 11/2009 |

(Continued)

OTHER PUBLICATIONS

Bae, Integrally Cored Ceramic Investment Casting Mold Fabricated by Ceramic Stereolithography, Chapter 5, A Dissertation Submitted in Partial Fulfillment of the Requirements for the Degree of Doctor of Philosophy, Materials and Engineering, 2008, pp. 102-139.

(Continued)

*Primary Examiner* — Katheryn A Malatek
(74) *Attorney, Agent, or Firm* — Dority & Manning, P.A.

(57) ABSTRACT

A gas turbine engine is provided. The gas turbine engine includes: a turbomachine having a compressor section, a combustion section, and a turbine section arranged in serial flow order, the compressor section having a high pressure compressor defining a high pressure compressor exit area ($A_{HPCExit}$) in square inches; wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific determined as follows: $Fn_{Total} \times EGT/(A_{HPCExit}^2 \times 1000)$.

20 Claims, 11 Drawing Sheets

(56) References Cited

U.S. PATENT DOCUMENTS

| | | |
|---|---|---|
| 3,420,055 A | 1/1969 | Lavash |
| 3,528,250 A | 9/1970 | Johnson |
| 3,628,885 A | 12/1971 | Sidenstick |
| 3,651,645 A | 3/1972 | Grieb |
| 3,779,007 A | 12/1973 | Lavash |
| 4,012,012 A | 3/1977 | Ligler |
| 4,064,692 A | 12/1977 | Johnson et al. |
| 4,078,604 A | 3/1978 | Christl et al. |
| 4,078,761 A | 3/1978 | Thompson |
| 4,120,150 A | 10/1978 | Wakeman |
| 4,137,705 A | 2/1979 | Andersen et al. |
| 4,254,618 A | 3/1981 | Elovic |
| 4,263,786 A | 4/1981 | Eng |
| 4,546,605 A | 10/1985 | Mortimer et al. |
| 4,696,156 A | 9/1987 | Burr et al. |
| 4,741,152 A | 5/1988 | Burr et al. |
| 4,773,212 A | 9/1988 | Griffin et al. |
| 4,776,536 A | 10/1988 | Hudson et al. |
| 4,966,005 A | 10/1990 | Cowell et al. |
| 5,024,580 A | 6/1991 | Olive |
| 5,121,598 A | 6/1992 | Butler |
| 5,152,146 A | 10/1992 | Butler |
| 5,177,951 A | 1/1993 | Butler |
| 5,203,163 A | 4/1993 | Parsons |
| 5,241,814 A | 9/1993 | Butler |
| 5,255,505 A | 10/1993 | Cloyd et al. |
| 5,256,340 A | 10/1993 | Allison et al. |
| 5,261,227 A | 11/1993 | Giffin, III |
| 5,296,308 A | 3/1994 | Caccavale et al. |
| 5,297,386 A | 3/1994 | Kervistin |
| 5,305,616 A | 4/1994 | Coffinberry |
| 5,317,877 A | 6/1994 | Stuart |
| 5,370,499 A | 12/1994 | Lee |
| 5,387,380 A | 2/1995 | Cima et al. |
| 5,392,614 A | 2/1995 | Coffinberry |
| 5,402,638 A | 4/1995 | Johnson |
| 5,414,992 A | 5/1995 | Glickstein |
| 5,511,374 A | 4/1996 | Glickstein et al. |
| 5,544,700 A | 8/1996 | Shagoury |
| 5,545,003 A | 8/1996 | O'Connor et al. |
| 5,553,449 A | 9/1996 | Rodgers et al. |
| 5,558,303 A | 9/1996 | Koethe et al. |
| 5,615,547 A | 4/1997 | Beutin et al. |
| 5,619,855 A | 4/1997 | Burrus |
| 5,680,767 A | 10/1997 | Lee et al. |
| 5,724,816 A | 3/1998 | Ritter et al. |
| 5,782,076 A | 7/1998 | Huber et al. |
| 5,802,841 A | 9/1998 | Maeda |
| 5,819,525 A | 10/1998 | Gaul et al. |
| 5,853,044 A | 12/1998 | Wheaton et al. |
| 5,918,458 A | 7/1999 | Coffinberry et al. |
| 6,106,229 A | 8/2000 | Nikkanen et al. |
| 6,117,612 A | 9/2000 | Halloran et al. |
| 6,182,435 B1 | 2/2001 | Niggemann et al. |
| 6,182,458 B1 | 2/2001 | Franklin, Jr. |
| 6,253,554 B1 | 7/2001 | Kobayashi et al. |
| 6,302,191 B1 | 10/2001 | Wickham et al. |
| 6,347,660 B1 | 2/2002 | Sikkenga et al. |
| 6,415,595 B1 | 7/2002 | Wilmot, Jr. et al. |
| 6,578,362 B1 | 6/2003 | Coffinberry |
| 6,584,778 B1 | 7/2003 | Griffiths et al. |
| 6,595,749 B2 | 7/2003 | Lee et al. |
| 6,805,535 B2 | 10/2004 | Tiemann |
| 6,913,064 B2 | 7/2005 | Beals et al. |
| 6,990,797 B2 | 1/2006 | Venkataramani et al. |
| 6,993,913 B2 | 2/2006 | Kobayashi et al. |
| 7,000,404 B2 | 2/2006 | Palmisano et al. |
| 7,140,174 B2 | 11/2006 | Johnson |
| 7,143,581 B2 | 12/2006 | Kobayashi et al. |
| 7,188,464 B2 | 3/2007 | Ackerman et al. |
| 7,216,475 B2 | 5/2007 | Johnson |
| 7,231,769 B2 | 6/2007 | Spadaccini et al. |
| 7,260,926 B2 | 8/2007 | Sabatino et al. |
| 7,306,026 B2 | 12/2007 | Memmen |
| 7,395,657 B2 | 7/2008 | Johnson |
| 7,448,433 B2 | 11/2008 | Ortiz et al. |
| 7,452,202 B2 | 11/2008 | Gram |
| 7,481,214 B2 | 1/2009 | Eilers |
| 7,527,475 B1 | 5/2009 | Liang |
| 7,533,713 B2 | 5/2009 | Pfeifer et al. |
| 7,608,131 B2 | 10/2009 | Jensen |
| 7,610,946 B2 | 11/2009 | Morris et al. |
| 7,624,592 B2 | 12/2009 | Lui et al. |
| 7,716,913 B2 | 5/2010 | Rolt |
| 7,717,676 B2 | 5/2010 | Cunha et al. |
| 7,753,104 B2 | 7/2010 | Luczak et al. |
| 7,770,381 B2 | 8/2010 | Johnson et al. |
| 7,836,680 B2 | 11/2010 | Schwarz et al. |
| 7,926,289 B2 | 4/2011 | Lee et al. |
| 8,015,788 B2 | 9/2011 | Stephenson et al. |
| 8,056,345 B2 | 11/2011 | Norris et al. |
| 8,066,052 B2 | 11/2011 | Blair |
| 8,307,662 B2 | 11/2012 | Turco |
| 8,506,836 B2 | 8/2013 | Szuromi et al. |
| 8,641,807 B2 | 2/2014 | Thomas |
| 8,747,055 B2 | 6/2014 | McCune et al. |
| 8,789,376 B2 | 7/2014 | Coffinberry |
| 8,851,151 B2 | 10/2014 | Frasier et al. |
| 8,943,827 B2 | 2/2015 | Prociw et al. |
| 8,955,330 B2 | 2/2015 | Narcus et al. |
| 8,961,114 B2 | 2/2015 | Ruthemeyer |
| 8,985,540 B1 | 3/2015 | Slesinski |
| 9,039,382 B2 | 5/2015 | Stapleton |
| 9,079,357 B2 | 7/2015 | Ebert et al. |
| 9,200,855 B2 | 12/2015 | Kington et al. |
| 9,410,482 B2 | 8/2016 | Krautheim et al. |
| 9,422,063 B2 | 8/2016 | Diaz |
| 9,429,072 B2 | 8/2016 | Diaz et al. |
| 9,458,764 B2 | 10/2016 | Alecu et al. |
| 9,650,147 B2 | 5/2017 | Selechert et al. |
| 9,677,501 B2 | 6/2017 | Pierluissi et al. |
| 9,835,035 B2 | 12/2017 | Mueller et al. |
| 9,845,768 B2 | 12/2017 | Pesyna et al. |
| 9,920,710 B2 | 3/2018 | Dawson et al. |
| 9,995,314 B2 | 6/2018 | Miller et al. |
| 10,022,790 B2 | 7/2018 | Lee et al. |
| 10,100,736 B2 | 10/2018 | Niergarth et al. |
| 10,260,419 B2 | 4/2019 | Cerny et al. |
| 10,280,486 B2 | 5/2019 | Zhang et al. |
| 10,352,243 B2 | 7/2019 | Mizukami et al. |
| 10,399,270 B2 | 9/2019 | Xu et al. |
| 10,578,028 B2 | 3/2020 | Becker, Jr. |
| 10,654,579 B2 | 5/2020 | Diaz |
| 2001/0024000 A1 | 9/2001 | Lee et al. |
| 2005/0109016 A1 | 5/2005 | Ullyott |
| 2005/0205232 A1 | 9/2005 | Wang et al. |
| 2008/0006384 A1 | 1/2008 | Memmen |
| 2008/0080979 A1 | 4/2008 | Brassfield et al. |
| 2008/0110603 A1 | 5/2008 | Fellague et al. |
| 2008/0135722 A1 | 6/2008 | Wang et al. |
| 2008/0190093 A1 | 8/2008 | Gauthier et al. |
| 2008/0310955 A1 | 12/2008 | Norris et al. |
| 2008/0314573 A1 | 12/2008 | Schwarz et al. |
| 2009/0060714 A1 | 3/2009 | Moors |
| 2009/0175718 A1 | 7/2009 | Diaz et al. |
| 2009/0188234 A1 | 7/2009 | Suciu et al. |
| 2009/0211273 A1 | 8/2009 | Klewer |
| 2009/0229812 A1 | 9/2009 | Pineo et al. |
| 2010/0003619 A1 | 1/2010 | Das et al. |
| 2010/0025001 A1 | 2/2010 | Lee et al. |
| 2010/0028645 A1 | 2/2010 | Maguire et al. |
| 2010/0068464 A1 | 3/2010 | Meyer |
| 2010/0068465 A1 | 3/2010 | Su et al. |
| 2010/0107603 A1 | 5/2010 | Smith |
| 2010/0139288 A1 | 6/2010 | Rago |
| 2010/0170262 A1 | 7/2010 | Kaslusky et al. |
| 2010/0192593 A1 | 8/2010 | Brown et al. |
| 2010/0212857 A1 | 8/2010 | Bulin et al. |
| 2011/0079683 A1 | 4/2011 | Stolte et al. |
| 2011/0088405 A1 | 4/2011 | Turco |
| 2011/0132562 A1 | 6/2011 | Merrill et al. |
| 2011/0132563 A1 | 6/2011 | Merrill et al. |
| 2011/0150634 A1 | 6/2011 | Bajusz et al. |
| 2011/0162387 A1 | 7/2011 | Chir et al. |

(56) References Cited

U.S. PATENT DOCUMENTS

| | | |
|---|---|---|
| 2011/0302928 A1 | 12/2011 | Mudawar |
| 2011/0310370 A1 | 12/2011 | Rohner et al. |
| 2011/0314835 A1 | 12/2011 | Liu |
| 2012/0067055 A1 | 3/2012 | Held |
| 2012/0174583 A1 | 7/2012 | Lehar |
| 2012/0192578 A1 | 8/2012 | Finney |
| 2012/0243970 A1 | 9/2012 | Hellgren et al. |
| 2012/0248657 A1 | 10/2012 | Ebert et al. |
| 2012/0297789 A1 | 11/2012 | Coffinberry |
| 2013/0104564 A1 | 5/2013 | Arar |
| 2013/0186100 A1 | 7/2013 | Rhoden et al. |
| 2013/0195658 A1 | 8/2013 | Saito et al. |
| 2013/0224423 A1 | 8/2013 | Mikulak et al. |
| 2013/0247587 A1 | 9/2013 | Lo |
| 2013/0333855 A1 | 12/2013 | Merrill et al. |
| 2014/0079540 A1 | 3/2014 | Morris et al. |
| 2014/0182264 A1 | 7/2014 | Weisgerber et al. |
| 2014/0230444 A1 | 8/2014 | Hao et al. |
| 2014/0271129 A1 | 9/2014 | Mueller et al. |
| 2014/0352315 A1 | 12/2014 | Diaz |
| 2014/0352562 A1 | 12/2014 | Raymond, Jr. |
| 2015/0000291 A1 | 1/2015 | Smith et al. |
| 2015/0037601 A1 | 2/2015 | Blackmore |
| 2015/0048209 A1 | 2/2015 | Hoyt et al. |
| 2015/0064015 A1 | 3/2015 | Perez |
| 2015/0068629 A1 | 3/2015 | Kottilingam et al. |
| 2015/0076739 A1 | 3/2015 | Batchelder |
| 2015/0090070 A1 | 4/2015 | Etter et al. |
| 2015/0100607 A1 | 4/2015 | Kobashi et al. |
| 2015/0114611 A1 | 4/2015 | Morris et al. |
| 2015/0202683 A1 | 7/2015 | Bunker |
| 2015/0209910 A1 | 7/2015 | Denney et al. |
| 2015/0306657 A1 | 10/2015 | Frank |
| 2015/0321249 A1 | 11/2015 | Shah et al. |
| 2015/0321250 A1 | 11/2015 | Xu |
| 2015/0337730 A1 | 11/2015 | Kupiszewski et al. |
| 2015/0354465 A1 | 12/2015 | Suciu et al. |
| 2016/0038866 A1 | 2/2016 | Gibson et al. |
| 2016/0059302 A1 | 3/2016 | McBrien et al. |
| 2016/0108814 A1 | 4/2016 | Schmitz |
| 2016/0201684 A1 | 7/2016 | Schwarz et al. |
| 2016/0221262 A1 | 8/2016 | Das et al. |
| 2016/0298550 A1 | 10/2016 | Kupratis et al. |
| 2016/0326963 A1 | 11/2016 | Yamazaki |
| 2016/0341126 A1 | 11/2016 | Kupratis et al. |
| 2017/0030266 A1 | 2/2017 | Cerny et al. |
| 2017/0044984 A1 | 2/2017 | Pesyna et al. |
| 2017/0087630 A1 | 3/2017 | Lee et al. |
| 2017/0114721 A1 | 4/2017 | Miller et al. |
| 2017/0159563 A1 | 6/2017 | Sennoun |
| 2017/0159566 A1 | 6/2017 | Sennoun et al. |
| 2017/0167382 A1 | 6/2017 | Miller et al. |
| 2017/0184027 A1 | 6/2017 | Moniz et al. |
| 2017/0260905 A1 | 9/2017 | Schmitz |
| 2018/0029944 A1 | 2/2018 | Subramanian et al. |
| 2018/0161852 A1 | 6/2018 | McCarren et al. |
| 2018/0161853 A1 | 6/2018 | Deines et al. |
| 2018/0161854 A1 | 6/2018 | Deines et al. |
| 2018/0161855 A1 | 6/2018 | Deines et al. |
| 2018/0161856 A1 | 6/2018 | Yang et al. |
| 2018/0161857 A1 | 6/2018 | Garay et al. |
| 2018/0161858 A1 | 6/2018 | Garay et al. |
| 2018/0161859 A1 | 6/2018 | Garay et al. |
| 2018/0161866 A1 | 6/2018 | Deines et al. |
| 2019/0218971 A1 | 7/2019 | Niergarth et al. |
| 2019/0359340 A1 | 11/2019 | Pachidis et al. |
| 2021/0199013 A1 | 7/2021 | Read et al. |
| 2022/0288673 A1 | 9/2022 | Deines et al. |

FOREIGN PATENT DOCUMENTS

| | | |
|---|---|---|
| CN | 102078924 A | 6/2011 |
| CN | 202291247 U | 7/2012 |
| CN | 102802834 A | 11/2012 |
| CN | 103008558 A | 4/2013 |
| CN | 203441604 U | 2/2014 |
| CN | 105579688 A | 5/2016 |
| CN | 107035528 A | 8/2017 |
| DE | 102009039255 A1 | 3/2011 |
| EP | 2359959 A1 | 8/2011 |
| EP | 2359962 A2 | 8/2011 |
| EP | 2992982 A1 | 3/2016 |
| EP | 3514349 A1 | 7/2019 |
| GB | 2034822 A | 6/1980 |
| JP | H07208200 A | 8/1995 |
| JP | 2013/512783 A | 4/2013 |
| JP | 2014/208373 A | 11/2014 |
| JP | 2016/501139 A | 1/2016 |
| JP | 2015/516591 A | 6/2016 |
| JP | 2016/533905 A | 11/2016 |
| WO | WO9703281 A1 | 1/1997 |
| WO | WO032331 A1 | 6/2000 |
| WO | WO0051761 A1 | 9/2000 |
| WO | WO2015021168 A1 | 2/2015 |
| WO | WO2015026535 A1 | 2/2015 |
| WO | WO2015053846 A2 | 4/2015 |
| WO | WO2015112885 A1 | 7/2015 |

OTHER PUBLICATIONS

Krithivasan, Detection of Propagation of Over-Heat Sections in Supply Air Duct of Aircrafts, Honeywell Technology Solutions Lab Pvt Ltd., Dec. 6, 2011, pp. 1-6.

Kumar et al., 3D Printing of Hollow Compounds, IJRET: International Journal of Research in Engineering and Technology, vol. 4, Issue 12, 2015, pp. 18-21.

Mikro Systems, Advanced Filtration to Improve Single Crystal Casting Yield, National Energy Technology Laboratory, Aug. 2013, pp. 1-4.

Rame et al., Development of AGAT, a Third-Generation Nickel-Based Superalloy for Single Crystal Turbine Blade Applications, the Minerals, Metals & Materials Society, Superalloys 2020, pp. 31-40.

| HPC EXIT AREA | REDLINE EGT | SLS THRUST | CST |
|---|---|---|---|
| 29.1 | 1153 | 39262 | 53.6 |
| 27.1 | 1205 | 39258 | 64.5 |
| 28.4 | 1071 | 39292 | 52.2 |
| 26.1 | 1123 | 39288 | 64.6 |
| 24.7 | 1160 | 39285 | 74.5 |
| 26.2 | 1155 | 39262 | 66.2 |
| 27.0 | 1207 | 39257 | 64.9 |
| 27.0 | 1125 | 39289 | 60.6 |
| 24.6 | 1161 | 39285 | 75.0 |
| 29.1 | 1152 | 39262 | 53.3 |
| 28.4 | 1071 | 39292 | 52.1 |
| 27.0 | 1123 | 39287 | 60.3 |

GAS TURBINE ENGINE

CROSS-REFERENCE TO RELATED APPLICATIONS

This application is a continuation-in-part application of U.S. application Ser. No. 17/978,629 filed Nov. 1, 2022, which is a non-provisional application and is hereby incorporated by reference in its entirety.

FIELD

The present disclosure relates to a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

DETAILED DESCRIPTION

Figure 1:
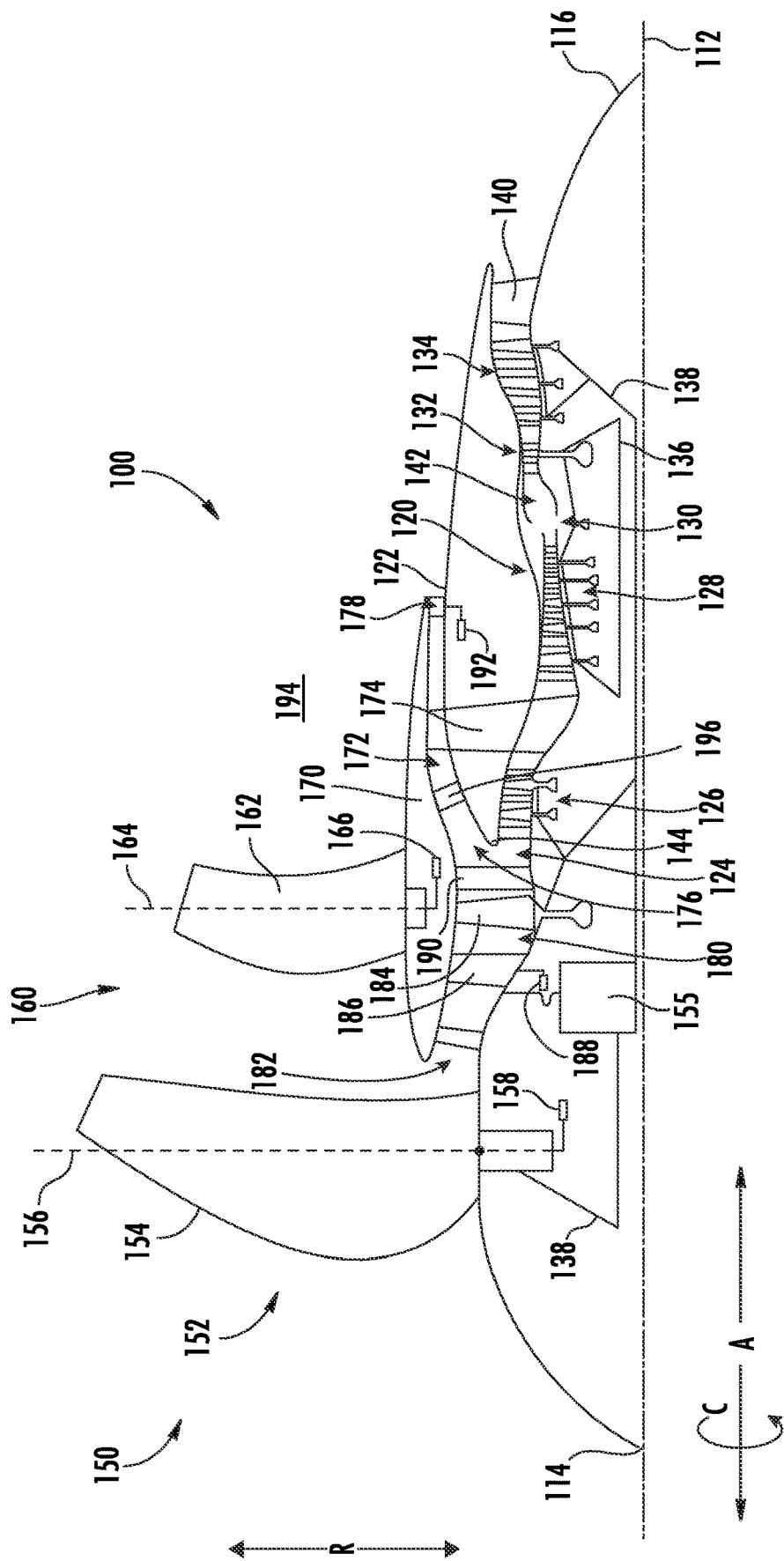
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "cooled cooling air system" is used herein to mean a system configured to provide a cooling airflow to one or more components exposed to a working gas flowpath of a turbomachine of a gas turbine engine at a location downstream of a combustor of the turbomachine and upstream of an exhaust nozzle of the turbomachine, the cooling airflow being in thermal communication with a heat exchanger for reducing a temperature of the cooling airflow at a location upstream of the one or more components.

Figure 4:
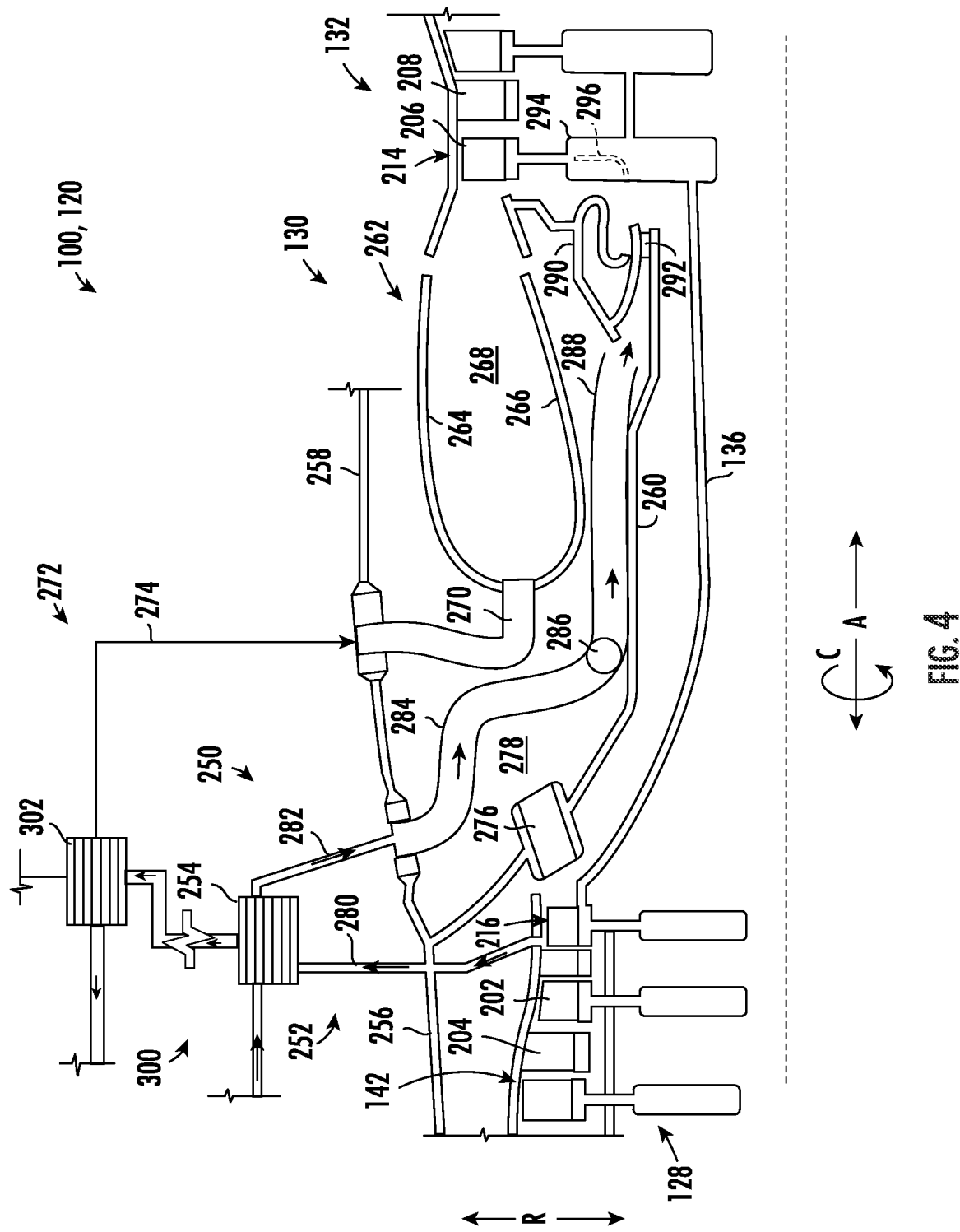
FIG. 4 is a close-up, schematic view of the exemplary three-stream engine of FIG. 1 showing the cooled cooling air system of FIG. 2.
Figure 9:
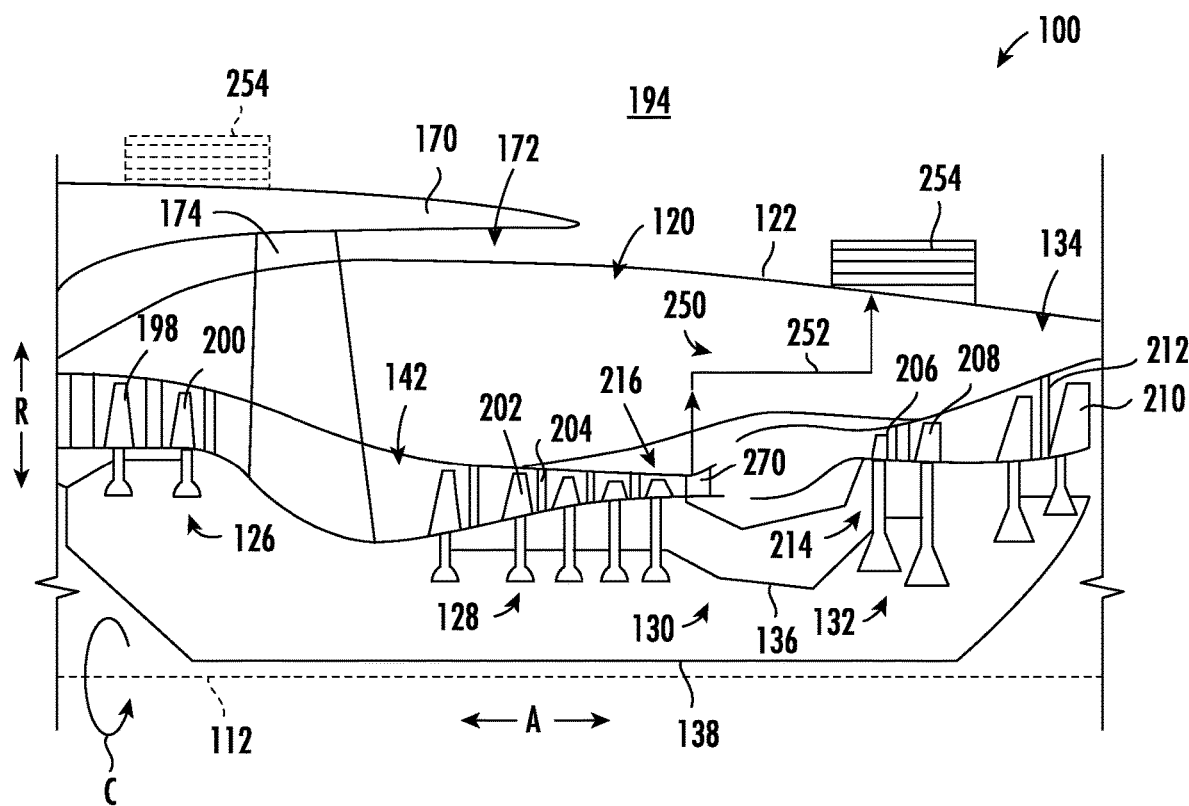
FIG. 9 is a schematic, close-up view of a gas turbine engine having a cooled cooling air system in accordance with another exemplary aspect of the present disclosure.

The cooled cooling air systems contemplated by the present disclosure may include a thermal bus cooled cooling air system (see, e.g., FIGS. 4 and 5) or a dedicated heat exchanger cooled cooling air system (i.e., a cooled cooling air system including a heat sink heat exchanger dedicated to the cooled cooling air system); a bypass heat exchanger cooled cooling air system having a heat sink heat exchanger thermally coupled to an airflow through a bypass passage (see, e.g., FIG. 9); an air-to-air cooled cooling air system (i.e., a cooled cooling air system having a heat sink heat exchanger configured to transfer heat to an airflow; see, e.g., FIG. 9); an oil-to-air cooled cooling air system (i.e., a cooled cooling air system having a heat sink heat exchanger configured to transfer heat to an oil flow); a fuel-to-air cooled cooling air system (i.e., a cooled cooling air system having a heat sink heat exchanger configured to transfer heat to a fuel flow, such as a Jet A fuel flow, a liquid hydrogen or hydrogen gas fuel flow, etc.; see, e.g., FIG. 4); or a combination thereof.

In one or more of the exemplary cooled cooling air systems described herein, the cooled cooling air system may receive the cooling air from a downstream end of a high pressure compressor (i.e., a location closer to a last stage of the high pressure compressor), an upstream end of the high pressure compressor (i.e., a location closer to a first stage of the high pressure compressor), a downstream end of a low pressure compressor (i.e., a location closer to a last stage of the low pressure compressor), an upstream end of the low pressure compressor (i.e., a location closer to a first stage of the low pressure compressor), a location between compressors, a bypass passage, a combination thereof, or any other suitable airflow source.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "takeoff power level" refers to a power level of a gas turbine engine used during a takeoff operating mode of the gas turbine engine during a standard day operating condition.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. For example, with reference to the exemplary engine 100 discussed below with reference to FIG. 2, the term redline EGT refers to a maximum permitted takeoff temperature of an airflow after the first stator 208 downstream of the last stage of rotor blades 206 of the HP turbine 132 (at location 215 into the first of the plurality of LP turbine rotor blades 210). In embodiments wherein the engine is configured as a three spool engine (as compared to the two spool engine of FIG. 2; see FIG. 12), the term redline EGT refers to a maximum permitted takeoff temperature of an airflow after the first stator downstream of the last stage of rotor blades of the intermediate speed turbine (see intermediate speed turbine 516 of the engine 500 of FIG. 12). The term redline EGT is sometimes also referred to as an indicated turbine exhaust gas temperature or indicated turbine temperature.

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough. A relatively small amount of thrust may also be generated by an airflow exiting the working gas flowpath of the turbomachine through the exhaust section. In addition, certain turbofan engines may further include a third stream that contributes to a total thrust output of the turbofan engine, potentially allowing for a reduction in size of a core of the turbomachine for a given total turbofan engine thrust output.

Conventional turbofan engine design practice has limited a compressor pressure ratio based at least in part on the gas temperatures at the exit stage of a high pressure compressor. These relatively high temperatures at the exit of the high pressure compressor may also be avoided when they result in prohibitively high temperatures at an inlet to the turbine section, as well as when they result in prohibitively high exhaust gas temperatures through the exhaust section. For a desired turbofan engine thrust output produced from an increased pressure ratio across the high pressure compressor, there is an increase in the gas temperature at the compressor exit, at a combustor inlet, at the turbine section inlet, and through an exhaust section of the turbofan engine.

The inventors have recognized that there are generally three approaches to making a gas turbine engine capable of operating at higher temperatures while providing a net benefit to engine performance: reducing the temperature of a gas used to cool core components, utilizing materials capable of withstanding higher operating temperature conditions, or a combination thereof.

Referring to the case of an engine that utilizes cooled cooling air for operating at higher temperatures, the inventors of the present disclosure discovered, unexpectedly, that the costs associated with achieving a higher compression by reducing gas temperatures used to cool core components to accommodate higher core gas temperatures may indeed produce a net benefit, contrary to prior expectations in the art. The inventors discovered during the course of designing several engine architectures of varying thrust classes and mission requirements (including the engines illustrated and described in detail herein) a relationship exists among the exhaust gas passing through the exhaust section, the desired maximum thrust for the engine, and the size of the exit stage of the high pressure compressor, whereby including this technology produces a net benefit. Previously it was thought that the cost for including a technology to reduce the temperature of gas intended for cooling compressor and turbine components was too prohibitive, as compared to the benefits of increasing the core temperatures.

For example, the inventors of the present disclosure found that a cooled cooling air system may be included while maintaining or even increasing the maximum turbofan engine thrust output, based on this discovery. The cooled cooling air system may receive an airflow from the compressor section, reduce a temperature of the airflow using a heat exchanger, and provide the cooled airflow to one or more components of the turbine section, such as a first stage of high pressure turbine rotor blades. In such a manner, a first stage of high pressure turbine rotor blades may be capable of withstanding increased temperatures by using the cooled cooling air, while providing a net benefit to the turbofan engine, i.e., while taking into consideration the costs associated with accommodations made for the system used to cool the cooling air.

The inventors reached this conclusion after evaluating potentially negative impacts to engine performance brought on by introduction of a cooled cooling air system. For example, a cooled cooling air system may generally include a duct extending through a diffusion cavity between a compressor exit and a combustor within the combustion section, such that increasing the cooling capacity may concomitantly increase a size of the duct and thus increase a drag or blockage of an airflow through the diffusion cavity, potentially creating problems related to, e.g., combustor aerodynamics. Similarly, a dedicated or shared heat exchanger of the cooled cooling air system may be positioned in a bypass passage of the turbofan engine, which may create an aerodynamic drag or may increase a size of the shared heat exchanger and increase aerodynamic drag. Size and weight increases associated with maintaining certain risk tolerances were also taken into consideration. For example, a cooled cooling air system must be accompanied with adequate safeguards in the event of a burst pipe condition, which safeguards result in further increases in the overall size, complexity, and weight of the system.

With a goal of arriving at an improved turbofan engine capable of operating at higher temperatures at the compressor exit and turbine inlet, the inventors have proceeded in the manner of designing turbofan engines having an overall pressure ratio, total thrust output, redline exhaust gas temperature, and the supporting technology characteristics; checking the propulsive efficiency and qualitative turbofan engine characteristics of the designed turbofan engine; redesigning the turbofan engine to have higher or lower compression ratios based on the impact on other aspects of the architecture, total thrust output, redline exhaust gas temperature, and supporting technology characteristics; rechecking the propulsive efficiency and qualitative turbofan engine characteristics of the redesigned turbofan engine; etc. during the design of several different types of turbofan engines, including the turbofan engines described below with reference to FIGS. 1 and 4 through 8 through 11, which will now be discussed in greater detail.

Referring now to FIG. 1, a schematic cross-sectional view of an engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from a location downstream of a ducted mid-fan to a bypass passage over the turbomachine, as will be explained in more detail below.

For reference, the engine 100 defines an axial direction A, a radial direction R. and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section 130, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor of the combustion section 130 where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustion section 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustion section 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The working gas flowpath 142 is an annular duct positioned generally inward of the core cowl 122 along the radial direction R. The working gas flowpath 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween, and further defines a central blade axis 156. For this embodiment, each fan blade 154 of the fan 152 is rotatable about its respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170. Notably, the engine 100 defines a bypass passage 194 over the fan cowl 170 and core cowl 122.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan 152. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan duct flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the working gas flowpath 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the working gas flowpath 142 may at least partially co-extend (generally axially) on opposite sides (e.g., opposite radial sides) of the core cowl 122. For example, the fan duct 172 and the working gas flowpath 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the working gas flowpath 142 and the fan duct 172 by the leading edge 144 of the core cowl 122. The inlet duct 180 is wider than the working gas flowpath 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vane 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb as well as cruise.

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 196 may be positioned in thermal communication with the fan duct 172. For example, one or more heat exchangers 196 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 196 may be an annular heat exchanger extending substantially 360 degrees in the fan duct 172 (e.g., at least 300 degrees, such as at least 330 degrees). In such a manner, the heat exchanger 196 may effectively utilize the air passing through the fan duct 172 to cool one or more systems of the engine 100 (e.g., a cooled cooling air system (described below), lubrication oil systems, compressor bleed air, electrical components, etc.). The heat exchanger 196 uses the air passing through duct 172 as a heat sink and correspondingly increases the temperature of the air downstream of the heat exchanger 196 and exiting the fan exhaust nozzle 178.

As will be appreciated, the engine 100 defines a total sea level static thrust output $Fn_{Total}$, corrected to standard day conditions, which is generally equal to a maximum total engine thrust. It will be appreciated that "sea level static thrust corrected to standard day conditions" refers to an amount of thrust an engine is capable of producing while at rest relative to the earth and the surrounding air during standard day operating conditions.

The total sea level static thrust output $Fn_{Total}$ may generally be equal to a sum of: a fan stream thrust $Fn_{Fan}$ (i.e., an amount of thrust generated by the fan 152 through the bypass passage 194), the third stream thrust $Fn_{3S}$ (i.e., an amount of thrust generated through the fan duct 172), and a turbomachine thrust $Fn_{TM}$ (i.e., an amount of thrust generated by an airflow through the turbomachine exhaust nozzle 140), each during the static, sea level, standard day conditions. The engine 100 may define a total sea level static thrust output $Fn_{Total}$ greater than or equal to 15,000 pounds. For example, it will be appreciated that the engine 100 may be configured to generate at least 25,000 pounds and less than 80,000 pounds, such as between 25,000 and 50,000 pounds, such as between 35,000 and 45,000 pounds of thrust during a takeoff operating power, corrected to standard day sea level conditions.

Figure 2:
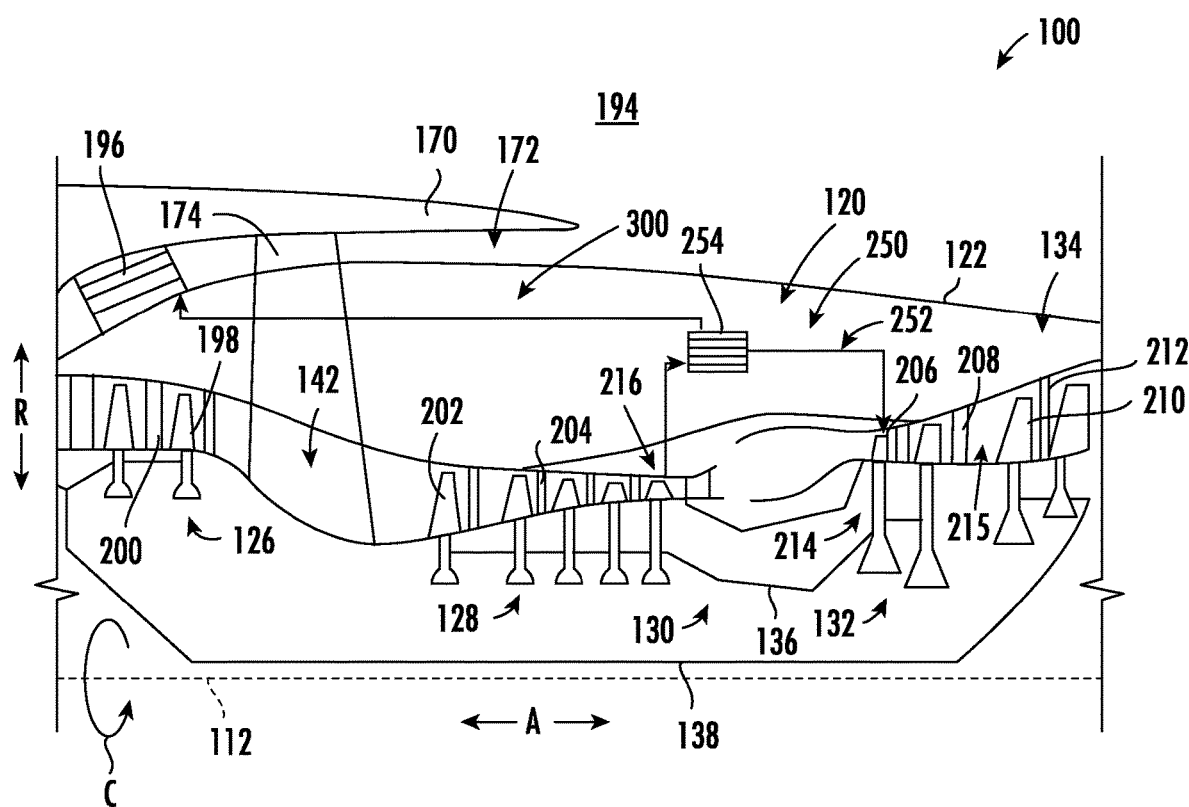
FIG. 2 is a close-up, schematic view of the exemplary three-stream engine of FIG. 1 with a cooled cooling air system in accordance with an exemplary embodiment of the present disclosure.

As will be appreciated, the engine 100 defines a redline exhaust gas temperature (referred to herein as "EGT"), which is defined above, and for the embodiment of FIG. 1 refers to a maximum permitted takeoff temperature of an airflow after the first stator 208 downstream of the last stage of rotor blades 206 of the HP turbine 132 (at location 215 into the first of the plurality of LP turbine rotor blades 210; see FIG. 2).

Referring now to FIG. 2, a close-up, simplified, schematic view of a portion of the engine 100 of FIG. 1 is provided. The engine 100, as noted above includes the turbomachine 120 having the LP compressor 126, the HP compressor 128, the combustion section 130, the HP turbine 132, and the LP turbine 134. The LP compressor 126 includes a plurality of stages of LP compressor rotor blades 198 and a plurality of stages of LP compressor stator vanes 200 alternatingly spaced with the plurality of stages of LP compressor rotor blades 198. Similarly, the HP compressor 128 includes a plurality of stages of HP compressor rotor blades 202 and a plurality of stages of HP compressor stator vanes 204 alternatingly spaced with the plurality of stages of HP compressor rotor blades 202. Moreover, within the turbine section, the HP turbine 132 includes at least one stage of HP turbine rotor blades 206 and at least one stage of HP turbine stator vanes 208, and the LP turbine 134 includes a plurality of stages of LP turbine rotor blades 210 and a plurality of stages of LP turbine stator vanes 212 alternatingly spaced with the plurality of stages of LP turbine rotor blades 210. With reference to the HP turbine 132, the HP turbine 132 includes at least a first stage 214 of HP turbine rotor blades 206.

Figure 3:
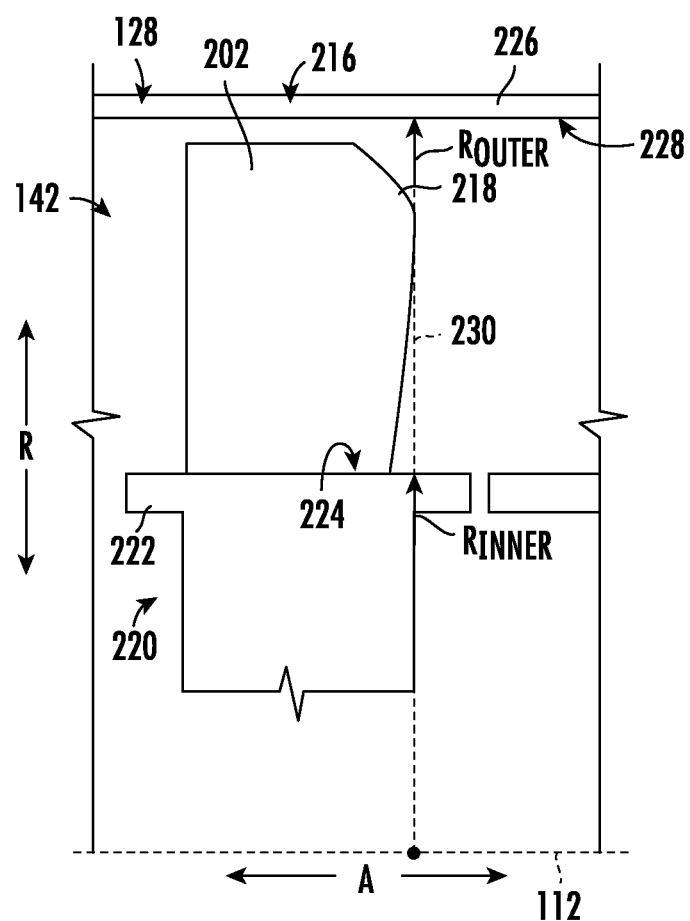
FIG. 3 is a close-up view of an aft-most stage of high pressure compressor rotor blades within the exemplary three-stream engine of FIG. 1.

Referring particularly to the HP compressor 128, the plurality of stages of HP compressor rotor blades 202 includes an aftmost stage 216 of HP compressor rotor blades 202. Referring briefly to FIG. 3, a close-up view of an HP compressor rotor blade 202 in the aftmost stage 216 of HP compressor rotor blades 202 is provided. As will be appreciated, the HP compressor rotor blade 202 includes a trailing edge 218 and the aftmost stage 216 of HP compressor rotor blades 202 includes a rotor 220 having a base 222 to which the HP compressor rotor blade 202 is coupled. The base 222 includes a flowpath surface 224 defining in part the working gas flow path 142 through the HP compressor 128. Moreover, the HP compressor 128 includes a shroud or liner 226 located outward of the HP compressor rotor blade 202 along the radial direction R. The shroud or liner 226 also includes a flowpath surface 228 defining in part the working gas flow path 142 through the HP compressor 128.

The engine 100 (FIG. 3) defines a reference plane 230 intersecting with an aft-most point of the trailing edge 218 of the HP compressor rotor blade 202 depicted, the reference plane 230 being orthogonal to the axial direction A. Further, the HP compressor 128 defines a high pressure compressor exit area ($A_{HPCExit}$) within the reference plane 230. More specifically, the HP compressor 128 defines an inner radius ($R_{INNER}$) extending along the radial direction R within the reference plane 230 from the longitudinal axis 112 to the flowpath surface 224 of the base 222 of the rotor 220 of the aftmost stage 216 of HP compressor rotor blades 202, as well as an outer radius (ROUTER) extending along the radial direction R within the reference plane 230 from the longitudinal axis 112 to the flowpath surface 228 of the shroud or liner 226. The HP compressor 128 exit area is defined according to Expression (1):

$$A_{HPCExit} = \pi(R_{OUTER}^2 - R_{INNER}^2).$$ Expression (1)

The inventors of the present disclosure have found that for a given total thrust output ($Fn_{Total}$), a decrease in size of the high pressure compressor exit area ($A_{HPCExit}$) may generally relate in an increase in a compressor exit temperature (i.e., a temperature of the airflow through the working gas flowpath 142 at the reference plane 230), a turbine inlet temperature (i.e., a temperature of the airflow through the working gas flowpath 142 provided to the first stage 214 of HP turbine rotor blades 206; see FIG. 2), and the redline exhaust gas temperature (EGT). In particular, the inventors of the present disclosure have found that the high pressure compressor exit area ($A_{HPCExit}$) may generally be used as an indicator of the above temperatures to be achieved by the engine 100 during operation for a given total thrust output ($Fn_{Total}$) of the engine 100.

Referring back to FIG. 2, the exemplary engine 100 depicted includes one or more technologies to accommodate the relatively small high pressure compressor exit area ($A_{HPCExit}$) for the total thrust output ($Fn_{Total}$) of the engine 100. In particular, for the embodiment depicted, the exemplary engine 100 includes a cooled cooling air system 250. The exemplary cooled cooling air system 250 is in fluid communication with the HP compressor 128 and the first stage 214 of HP turbine rotor blades 206. More specifically, for the embodiment depicted, the cooled cooling air system 250 includes a duct assembly 252 and a cooled cooling air (CCA) heat exchanger 254. The duct assembly 252 is in fluid communication with the HP compressor 128 for receiving an airflow from the HP compressor 128 and providing such airflow to the first stage 214 of HP turbine rotor blades 206 during operation of the engine 100. The CCA heat exchanger 254 is in thermal communication with the airflow through the duct assembly 252 for reducing a temperature of the airflow through the duct assembly 252 upstream of the first stage 214 of HP turbine rotor blades 206.

Briefly, as will be explained in more detail below, the engine 100 depicted further includes a thermal transport bus 300, with the CCA heat exchanger 254 of the cooled cooling air system 250 in thermal communication with, or integrated into, the thermal transport bus 300. For the embodiment depicted, the engine 100 further includes the heat exchanger 196 in the fan duct 172 in thermal communication with, or integrated into, the thermal transport bus 300, such that heat from the CCA heat exchanger 254 of the cooled cooling air system 250 may be transferred to the heat exchanger 196 in the fan duct 172 using the thermal transport bus 300.

Referring now to FIG. 4, a close-up, schematic view of the turbomachine 120 of the engine 100 of FIG. 2, including the cooled cooling air system 250, is provided.

As is shown, the turbine section includes a compressor casing 256, and the combustion section 130 of the turbomachine 120 generally includes an outer combustor casing 258, an inner combustor casing 260, and a combustor 262. The combustor 262 generally includes an outer combustion chamber liner 264 and an inner combustion chamber liner 266, together defining at least in part a combustion chamber 268. The combustor 262 further includes a fuel nozzle 270 configured to provide a mixture of fuel and air to the combustion chamber 268 to generate combustion gases.

The engine 100 further includes a fuel delivery system 272 including at least a fuel line 274 in fluid communication with the fuel nozzle 270 for providing fuel to the fuel nozzle 270.

The turbomachine 120 includes a diffuser nozzle 276 located downstream of the aftmost stage 216 of HP compressor rotor blades 202 of the HP compressor 128, within the working gas flowpath 142. In the embodiment depicted, the diffuser nozzle 276 is coupled to, or integrated with the inner combustor casing 260, the outer combustor casing 258, or both. The diffuser nozzle 276 is configured to receive compressed airflow from the HP compressor 128 and straighten such compressed air prior to such compressed air being provided to the combustion section 130. The combustion section 130 defines a diffusion cavity 278 downstream of the diffuser nozzle 276 and upstream of the combustion chamber 268.

As noted above, the exemplary engine 100 further includes the cooled cooling air system 250. The cooled cooling air system 250 includes the duct assembly 252 and the CCA heat exchanger 254. More specifically, the duct assembly 252 includes a first duct 280 in fluid communication with the HP compressor 128 and the CCA heat exchanger 254. The first duct 280 more specifically extends from the HP compressor 128, through the compressor casing 256, to the CCA heat exchanger 254. For the embodiment depicted, the first duct 280 is in fluid communication with the HP compressor 128 at a location in between the last two stages of HP compressor rotor blades 202. In such a manner, the first duct 280 is configured to receive a cooling airflow from the HP compressor 128 and to provide the cooling airflow to the CCA heat exchanger 254.

It will be appreciated, however, that in other embodiments, the first duct 280 may additionally or alternatively be in fluid communication with the HP compressor 128 at any other suitable location, such as at any other location closer to a downstream end of the HP compressor 128 than an upstream end of the HP compressor 128, or alternatively at a location closer to the upstream end of the HP compressor 128 than the downstream end of the HP compressor 128.

The duct assembly 252 further includes a second duct 282 extending from the CCA heat exchanger 254 to the outer combustor casing 258 and a third duct 284 extending from the outer combustor casing 258 inwardly generally along the radial direction R. The CCA heat exchanger 254 may be configured to receive the cooling airflow and to extract heat from the cooling airflow to reduce a temperature of the cooling airflow. The second duct 282 may be configured to receive cooling airflow from the CCA heat exchanger 254 and provide the cooling airflow to the third duct 284. The third duct 284 extends through the diffusion cavity generally along the radial direction R.

Moreover, for the embodiment depicted, the duct assembly 252 further includes a manifold 286 in fluid communication with the third duct 284 and a fourth duct 288. The manifold 286 extends generally along the circumferential direction C of the engine 100, and the fourth duct 288 is more specifically a plurality of fourth ducts 288 extending from the manifold 286 at various locations along the circumferential direction C forward generally along the axial direction A towards the turbine section. In such a manner, the duct assembly 252 of the cooled cooling air system 250 may be configured to provide cooling airflow to the turbine section at a variety of locations along the circumferential direction C.

Notably, referring still to FIG. 4, the combustion section 130 includes an inner stator assembly 290 located at a downstream end of the inner combustion chamber liner 266, and coupled to the inner combustor casing 260. The inner stator assembly 290 includes a nozzle 292. The fourth duct 288, or rather, the plurality of fourth ducts 288, are configured to provide the cooling airflow to the nozzle 292. The nozzle 292 may include a plurality of vanes spaced along the circumferential direction C configured to impart a circumferential swirl to the cooling airflow provided through the plurality of fourth ducts 288 to assist with such airflow being provided to the first stage 214 of HP turbine rotor blades 206.

In particular, for the embodiment depicted, the HP turbine 132 further includes a first stage HP turbine rotor 294, with the plurality of HP turbine rotor blades 206 of the first stage 214 coupled to the first stage HP turbine rotor 294. The first stage HP turbine rotor 294 defines an internal cavity 296 configured to receive the cooling airflow from the nozzle 292 and provide the cooling airflow to the plurality of HP turbine rotor blades 206 of the first stage 214. In such a manner, the cooled cooling air system 250 may provide cooling airflow to the HP turbine rotor blades 206 to reduce a temperature of the plurality HP turbine rotor blades 206 at the first stage 214 during operation of the engine 100.

For example, in certain exemplary aspects, the cooled cooling air system 250 may be configured to provide a temperature reduction of the cooling airflow equal to at least 15% of the EGT and up to 45% of the EGT. Further, in certain exemplary aspects, the cooled cooling air system 250 may be configured to receive between 2.5% and 35% of an airflow through the working gas flowpath 142 at an inlet to the HP compressor 128, such as between 3% and 20%, such as between 4% and 15%.

In addition, as briefly mentioned above, the cooled cooling air system 250 may utilize the thermal transport bus 300 to reject heat from the cooling air extracted from the compressor section of the turbomachine 120. In particular, for the embodiment shown the CCA heat exchanger 254 is in thermal communication with or integrated into the thermal transport bus 300. Notably, the thermal transport bus 300 further includes a fuel heat exchanger 302 in thermal communication with the fuel line 274. In such a manner, the thermal transport bus 300 may extract heat from the cooling air extracted from the compressor section through the cooled cooling air system 250 and provide such heat to a fuel flow through the fuel line 274 upstream of the fuel nozzle 270.

For the embodiment depicted, the thermal transport bus 300 includes a conduit having a flow of thermal transport fluid therethrough. More specifically, referring now briefly to FIG. 5, a schematic view of a thermal transport bus 300 as may be utilized with the exemplary engine 100 described above with reference to FIGS. 1 through 4 is provided.

The thermal transport bus 300 includes an intermediary heat exchange fluid flowing therethrough and is formed of one or more suitable fluid conduits 304. The heat exchange fluid may be an incompressible fluid having a high temperature operating range. Additionally, or alternatively, the heat exchange fluid may be a single phase fluid, or alternatively, may be a phase change fluid. In certain exemplary embodiments, the heat exchange fluid may be a supercritical fluid, such as a supercritical $CO_2$.

The exemplary thermal transport bus 300 includes a pump 306 in fluid communication with the heat exchange fluid in the thermal transport bus 300 for generating a flow of the heat exchange fluid in/through the thermal transport bus 300.

Moreover, the exemplary thermal transport bus 300 includes one or more heat source exchangers 308 in thermal communication with the heat exchange fluid in the thermal transport bus 300. Specifically, the thermal transport bus 300 depicted includes a plurality of heat source exchangers 308. The plurality of heat source exchangers 308 are configured to transfer heat from one or more of the accessory systems of an engine within which the thermal transport bus 300 is installed (e.g., engine 100 of FIGS. 1 through 4) to the heat exchange fluid in the thermal transport bus 300. For example, in certain exemplary embodiments, the plurality of heat source exchangers 308 may include one or more of: a CCA heat source exchanger (such as CCA heat exchanger 254 in FIGS. 2 and 4); a main lubrication system heat source exchanger for transferring heat from a main lubrication system; an advanced clearance control (ACC) system heat source exchanger for transferring heat from an ACC system; a generator lubrication system heat source exchanger for transferring heat from the generator lubrication system; an environmental control system (ECS) heat exchanger for transferring heat from an ECS; an electronics cooling system heat exchanger for transferring heat from the electronics cooling system; a vapor compression system heat source exchanger; an air cycle system heat source exchanger; and an auxiliary system(s) heat source exchanger.

For the embodiment depicted, there are three heat source exchangers 308. The heat source exchangers 308 are each arranged in series flow along the thermal transport bus 300. However, in other exemplary embodiments, any other suitable number of heat source exchangers 308 may be included and one or more of the heat source exchangers 308 may be arranged in parallel flow along the thermal transport bus 300 (in addition to, or in the alternative to the serial flow arrangement depicted). For example, in other embodiments there may be a single heat source exchanger 308 in thermal communication with the heat exchange fluid in the thermal transport bus 300, or alternatively, there may be at least two heat source exchangers 308, at least four heat source exchangers 308, at least five heat source exchangers 308, or at least six heat source exchangers 308, and up to twenty heat source exchangers 308 in thermal communication with heat exchange fluid in the thermal transport bus 300.

Figure 5:
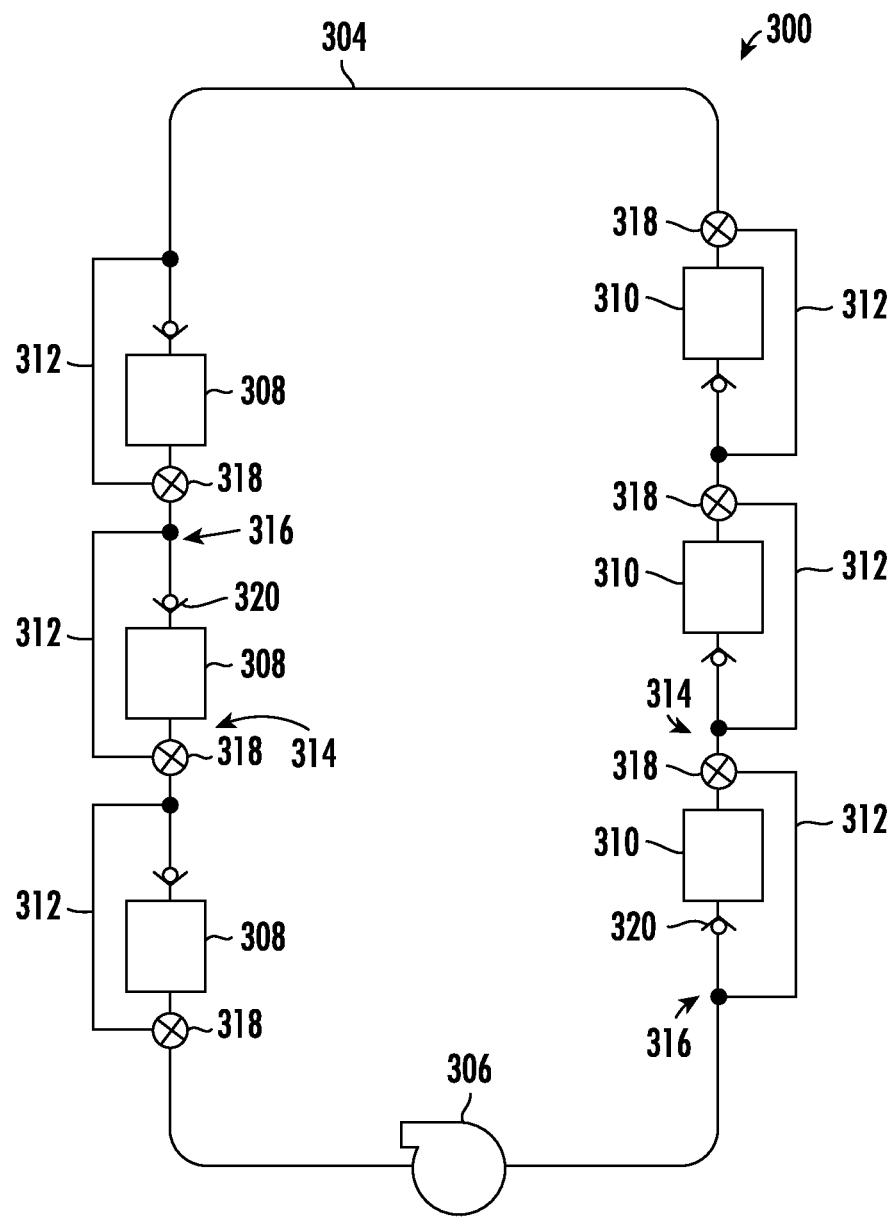
FIG. 5 is a schematic view of a thermal transport bus of the present disclosure.

Additionally, the exemplary thermal transport bus 300 of FIG. 5 further includes one or more heat sink exchangers 310 permanently or selectively in thermal communication with the heat exchange fluid in the thermal transport bus 300. The one or more heat sink exchangers 310 are located downstream of the plurality of heat source exchangers 308 and are configured for transferring heat from the heat exchange fluid in the thermal transport bus 300, e.g., to atmosphere, to fuel, to a fan stream, etc. For example, in certain embodiments the one or more heat sink exchangers 310 may include at least one of a RAM heat sink exchanger, a fuel heat sink exchanger, a fan stream heat sink exchanger, a bleed air heat sink exchanger, an engine intercooler heat sink exchanger, a bypass passage heat sink exchanger, or a cold air output heat sink exchanger of an air cycle system. The fuel heat sink exchanger is a "fluid to heat exchange fluid" heat exchanger wherein heat from the heat exchange fluid is transferred to a stream of liquid fuel (see, e.g., fuel heat exchanger 302 of the engine 100 of FIG. 4). Moreover, the fan stream heat sink exchanger is generally an "air to heat exchange fluid" heat exchanger which transfers heat from the heat exchange fluid to an airflow through the fan stream (see, e.g., heat exchanger 196 of FIGS. 1 and 2). Further, the bleed air heat sink exchanger is generally an "air to heat exchange fluid" heat exchanger which flows, e.g., bleed air from the LP compressor 126 over the heat exchange fluid to remove heat from the heat exchange fluid.

For the embodiment of FIG. 5, the one or more heat sink exchangers 310 of the thermal transport bus 300 depicted includes a plurality of individual heat sink exchangers 310. More particularly, for the embodiment of FIG. 5, the one or more heat sink exchangers 310 include three heat sink exchangers 310 arranged in series. The three heat sink exchangers 310 are configured as a bypass passage heat sink exchanger, a fuel heat sink exchanger, and a fan stream heat sink exchanger. However, in other exemplary embodiments, the one or more heat sink exchangers 310 may include any other suitable number and/or type of heat sink exchangers 310. For example, in other exemplary embodiments, a single heat sink exchanger 310 may be provided, at least two heat sink exchangers 310 may be provided, at least four heat sink exchangers 310 may be provided, at least five heat sink exchangers 310 may be provided, or up to twenty heat sink exchangers 310 may be provided. Additionally, in still other exemplary embodiments, two or more of the one or more heat sink exchangers 310 may alternatively be arranged in parallel flow with one another.

Referring still to the exemplary embodiment depicted in FIG. 5, one or more of the plurality of heat sink exchangers 310 and one or more of the plurality of heat source exchangers 308 are selectively in thermal communication with the heat exchange fluid in the thermal transport bus 300. More particularly, the thermal transport bus 300 depicted includes a plurality of bypass lines 312 for selectively bypassing each heat source exchanger 308 and each heat sink exchanger 310 in the plurality of heat sink exchangers 310. Each bypass line 312 extends between an upstream juncture 314 and a downstream juncture 316—the upstream juncture 314 located just upstream of a respective heat source exchanger 308 or heat sink exchanger 310, and the downstream juncture 316 located just downstream of the respective heat source exchanger 308 or heat sink exchanger 310.

Additionally, each bypass line 312 meets at the respective upstream juncture 314 with the thermal transport bus 300 via a three-way valve 318. The three-way valves 318 each include an inlet fluidly connected with the thermal transport bus 300, a first outlet fluidly connected with the thermal transport bus 300, and a second outlet fluidly connected with the bypass line 312. The three-way valves 318 may each be a variable throughput three-way valve, such that the three-way valves 318 may vary a throughput from the inlet to the first and/or second outlets. For example, the three-way valves 318 may be configured for providing anywhere between zero percent (0%) and one hundred percent (100%) of the heat exchange fluid from the inlet to the first outlet, and similarly, the three-way valves 318 may be configured for providing anywhere between zero percent (0%) and one hundred percent (100%) of the heat exchange fluid from the inlet to the second outlet.

Notably, the three-way valves 318 may be in operable communication with a controller of an engine including the thermal transport bus 300 (e.g., engine 100 of FIGS. 1 through 4).

Further, each bypass line 312 also meets at the respective downstream juncture 316 with the thermal transport bus 300. Between each heat source exchanger 308 or heat sink exchanger 310 and downstream juncture 316, the thermal transport bus 300 includes a check valve 320 for ensuring a proper flow direction of the heat exchange fluid. More particularly, the check valve 320 prevents a flow of heat exchange fluid from the downstream juncture 316 towards the respective heat source exchanger 308 or heat sink exchanger 310.

As alluded to earlier, the inventors discovered, unexpectedly during the course of gas turbine engine design—i.e., designing gas turbine engines having a variety of different high pressure compressor exit areas, total thrust outputs, redline exhaust gas temperatures, and supporting technology characteristics and evaluating an overall engine performance and other qualitative turbofan engine characteristics—a significant relationship between a total sea level static thrust output, a compressor exit area, and a redline exhaust gas temperature that enables increased engine core operating temperatures and overall engine propulsive efficiency. The relationship can be thought of as an indicator of the ability of a turbofan engine to have a reduced weight or volume as represented by a high pressure compressor exit area, while maintaining or even improving upon an overall thrust output, and without overly detrimentally affecting overall engine performance and other qualitative turbofan engine characteristics. The relationship applies to an engine that incorporates a cooled cooling air system, builds portions of the core using material capable of operating at higher temperatures, or a combination of the two. Significantly, the relationship ties the core size (as represented by the exit area of the higher pressure compressor) to the desired thrust and exhaust gas temperature associated with the desired propulsive efficiency and practical limitations of the engine design, as described below.

Referring to the case of an engine that utilizes cooled cooling air for operating at higher temperatures, the inventors discovered, unexpectedly, that the costs associated with achieving a higher compression, enabled by reducing gas temperatures used to cool core components to accommodate higher core gas temperatures, may indeed produce a net benefit, contrary to expectations in the art. Referring to the case of utilizing more temperature-resistant material, such as a Carbon Matrix Composite (CMC), it was found that certain aspects of the engine size, weight and operating characteristics can be positively affected while taking into account the complexities and/or drawbacks associated with such material. In either case, the relationship now described can apply to identify the interrelated operating conditions and core size—i.e., total sea level static thrust, redline exhaust gas temperature, and compressor exit area, respectively.

The inventors of the present disclosure discovered bounding the relationship between a product of total thrust output and redline exhaust gas temperature at a takeoff power level and the high pressure compressor exit area squared (corrected specific thrust) can result in a higher power density core. This bounded relationship, as described herein, takes into due account the amount of overall complexity and cost, and/or a low amount of reliability associated with implementing the technologies required to achieve the operating temperatures and exhaust gas temperature associated with the desired thrust levels. The amount of overall complexity and cost may be prohibitively high for gas turbine engines outside the bounds of the relationship as described herein, and/or the reliability may prohibitively low outside the bounds of the relationship as described herein. The relationship discovered, infra, can therefore identify an improved engine configuration suited for a particular mission requirement, one that takes into account efficiency, weight, cost, complexity, reliability, and other factors influencing the optimal choice for an engine configuration.

In addition to yielding an improved gas turbine engine, as explained in detail above, utilizing this relationship, the inventors found that the number of suitable or feasible gas turbine engine designs capable of meeting the above design requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, is expressed as:

$$CST = Fn_{Total} \times EGT / (A_{HPCExit}^2 \times 1000), \qquad \text{Expression (2)}$$

where CST is corrected specific thrust; $Fn_{Total}$ is a total sea level static thrust output of the gas turbine engine in pounds; EGT is redline exhaust gas temperature in degrees Celsius; and $A_{HPCExit}$ is a high pressure compressor exit area in square inches.

CST values of an engine defined by Expression (2) in accordance with various embodiments of the present disclosure are from 42 to 90, such as from 45 to 80, such as from 50 to 80. The units of the CST values may be pounds-degrees Celsius over square inches.

Figures 6, 7:
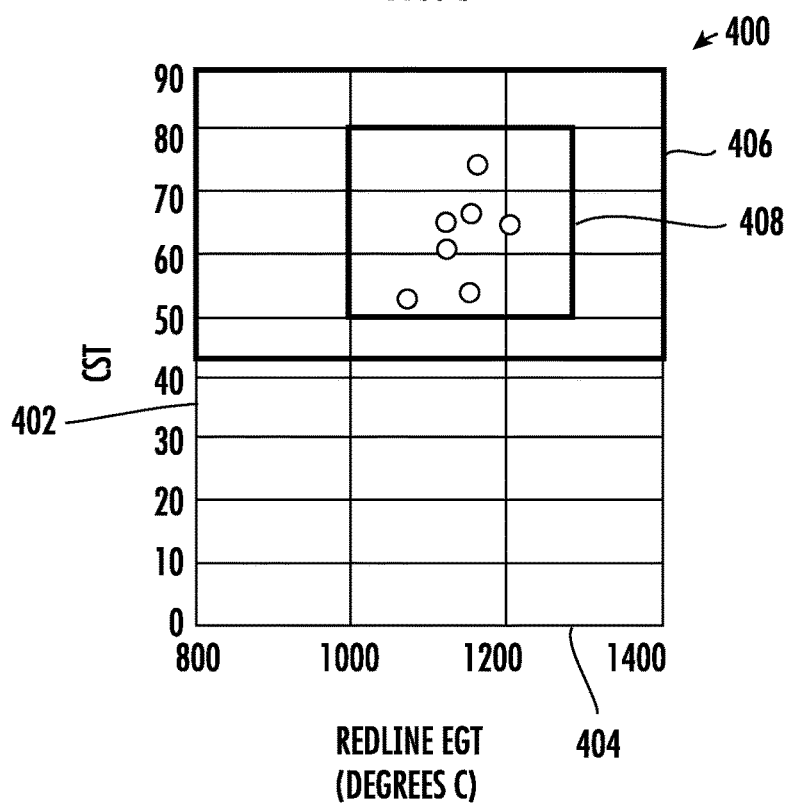
FIG. 6 is a table depicting numerical values showing the relationships between various parameters in accordance with various example embodiments of the present disclosure.
FIG. 7 is a graph depicting a range of corrected specific thrust values and redline exhaust gas temperature values of gas turbine engines in accordance with various example embodiments of the present disclosure.

Referring now to FIGS. 6 and 7, various exemplary gas turbine engines are illustrated in accordance with one or more exemplary embodiments of the present disclosure. In particular, FIG. 6 provides a table including numerical values corresponding to several of the plotted gas turbine engines in FIG. 7. FIG. 7 is a plot 400 of gas turbine engines in accordance with one or more exemplary embodiments of the present disclosure, showing the CST on a Y-axis 402 and the EGT on an X-axis 404.

As shown, the plot 400 in FIG. 7 depicts a first range 406, with the CST values between 42 and 90 and EGT values from 800 degrees Celsius to 1400 degrees Celsius. FIG. 7 additionally depicts a second range 408, with the CST values between 50 and 80 and EGT values from 1000 degrees Celsius to 1300 degrees Celsius. It will be appreciated that in other embodiments, the EGT value may be greater than 1100 degree Celsius and less than 1250 degrees Celsius, such as greater than 1150 degree Celsius and less than 1250 degrees Celsius, such as greater than 1000 degree Celsius and less than 1300 degrees Celsius.

It will be appreciated that although the discussion above is generally related to an open rotor engine having a particular cooled cooling air system 250 (FIG. 2), in various embodiments of the present disclosure, the relationship outlined above with respect to Expression (2) may be applied to any other suitable engine architecture, including any other suitable technology(ies) to allow the gas turbine engine to accommodate higher temperatures to allow for a reduction in the high pressure compressor exit area, while maintaining or even increasing the maximum turbofan engine thrust output without, e.g., prematurely wearing various components within the turbomachine exposed the working gas flowpath.

Figure 8:
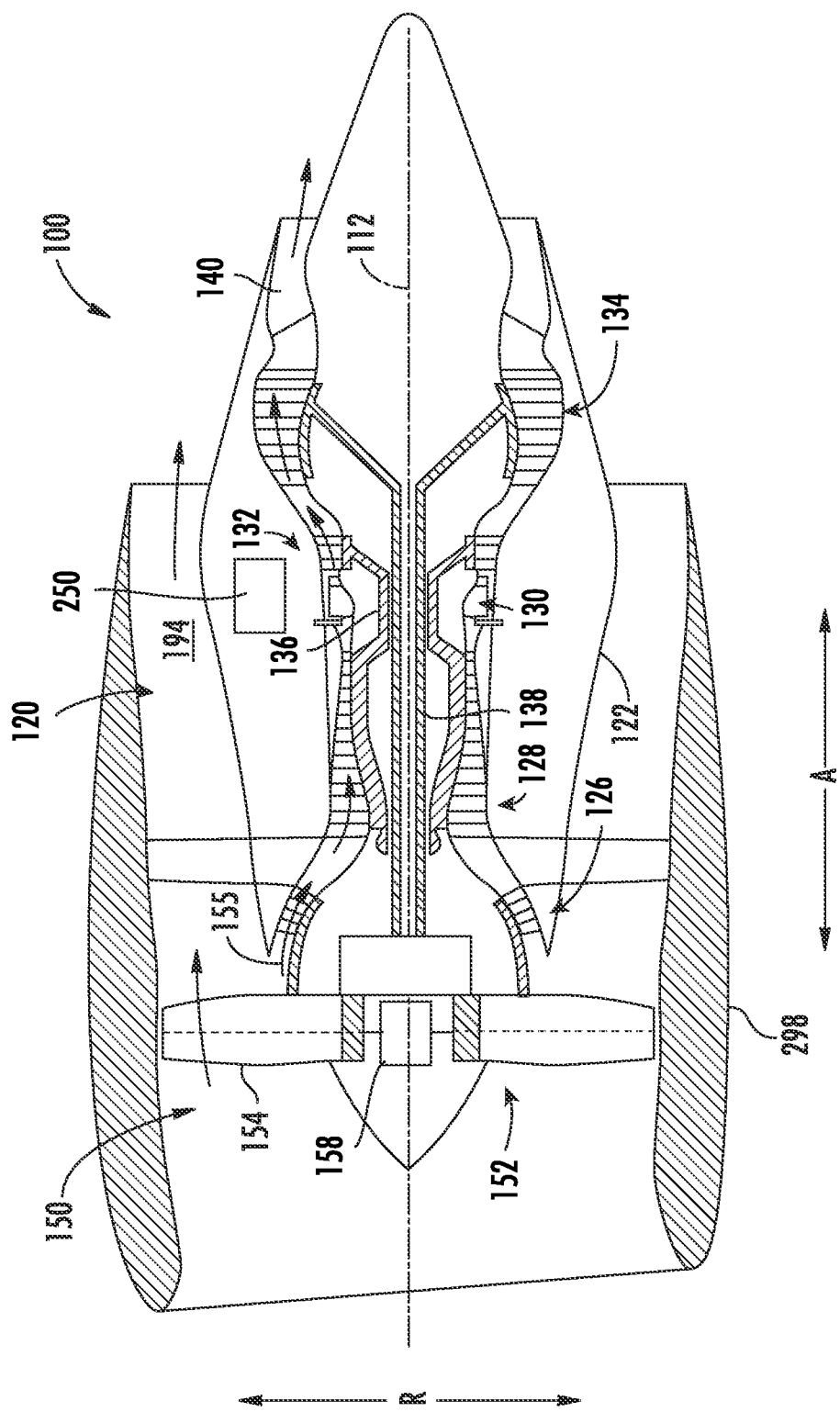
FIG. 8 is a schematic view of a ducted turbofan engine in accordance with an exemplary aspect of the present disclosure.

For example, reference will now be made to FIG. 8. FIG. 8 provides a schematic view of an engine 100 in accordance with another exemplary embodiment of the present disclosure. The exemplary embodiment of FIG. 8 may be configured in substantially the same manner as the exemplary engine 100 described above with respect to FIGS. 1 through 4, and the same or similar reference numerals may refer to the same or similar parts. However, as will be appreciated, for the embodiment shown, the engine 100 further includes an outer housing or nacelle 298 circumferentially surrounding at least in part a fan section 150 and a turbomachine 120. The nacelle 298 defines a bypass passage 194 between the nacelle 298 and the turbomachine 120.

Briefly, it will be appreciated that the exemplary engine 100 of FIG. 8 is configured as a two-stream engine, i.e., an engine without a third stream (e.g., fan stream 172 in the exemplary engine 100 of FIG. 2). With such a configuration, a total sea level static thrust output $Fn_{Total}$ of the engine 100 may generally be equal to a sum of: a fan stream thrust $Fn_{Fan}$ (i.e., an amount of thrust generated by a fan 152 through a bypass passage 194) and a turbomachine thrust $Fn_{TM}$ (i.e., an amount of thrust generated by an airflow through a turbomachine exhaust nozzle 140), each during the static, sea level, standard day conditions.

Further, for the exemplary embodiment of FIG. 8, the engine 100 additionally includes a cooled cooling air system 250 configured to provide a turbine section with cooled cooling air during operation of the engine 100, to allow the engine 100 to accommodate higher temperatures to allow for a reduction in a high pressure compressor exit area, while maintaining or even increasing a maximum turbofan engine thrust output.

It will be appreciated that in other exemplary embodiments of the present disclosure, the cooled cooling air system 250 of the engine 100 may be configured in any other suitable manner. For example, the exemplary cooled cooling air system 250 described above with reference to FIGS. 2 and 3 is generally configured as a thermal bus cooled cooling air system. However, in other embodiments, the cooled cooling air system 250 may instead be a dedicated heat exchanger cooled cooling air system (i.e., a cooled cooling air system including a heat exchanger that transfers heat directly to a cooling medium). Additionally, in other embodiments, the cooled cooling air system 250 may be a bypass heat exchanger cooled cooling air system having a heat sink heat exchanger thermally coupled to an airflow through a bypass passage (see, e.g., FIG. 9, discussed below). Additionally, or alternatively, in other embodiments, the cooled cooling air system 250 may be one of an air-to-air cooled cooling air system (a cooled cooling air system having a heat sink heat exchanger configured to transfer heat to an airflow; see, e.g., FIG. 9, discussed below); an oil-to-air cooled cooling air system (a cooled cooling air system having a heat sink heat exchanger configured to transfer heat to an oil flow); or a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4).

Figure 10:
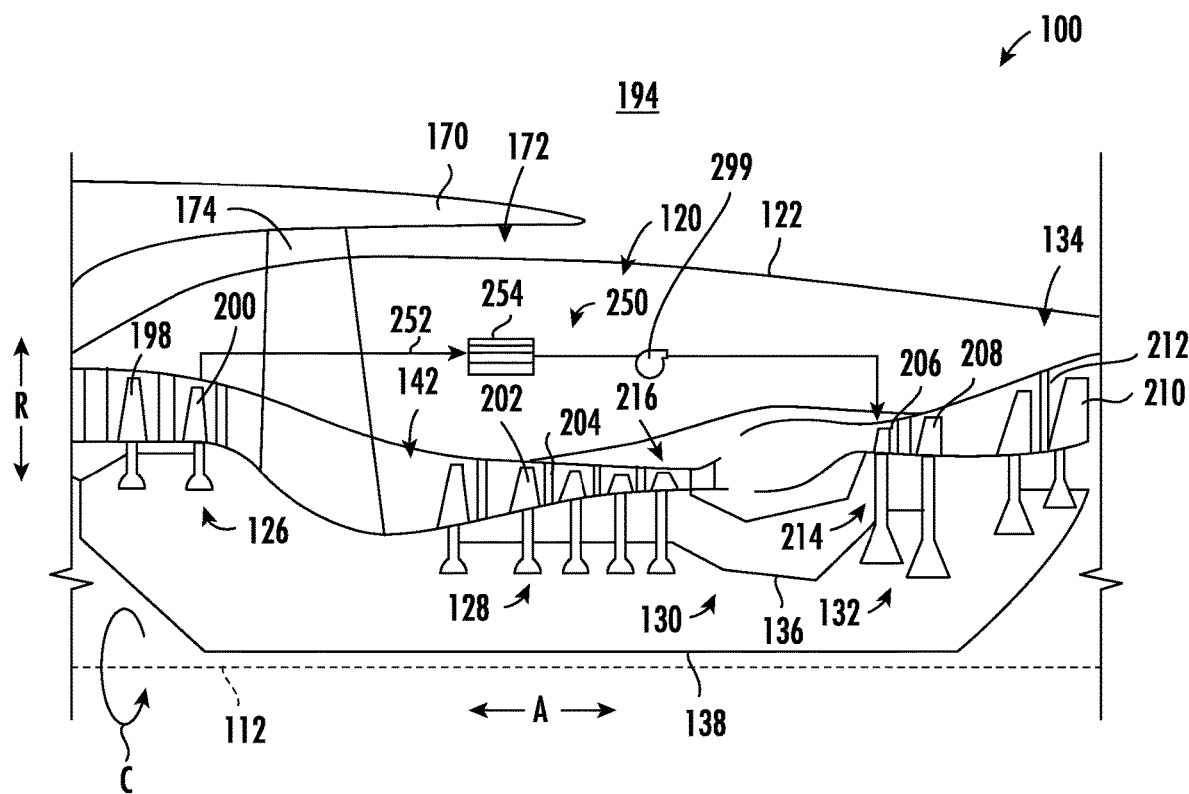
FIG. 10 is a schematic, close-up view of a gas turbine engine having a cooled cooling air system in accordance with yet another exemplary aspect of the present disclosure.
Figure 11:
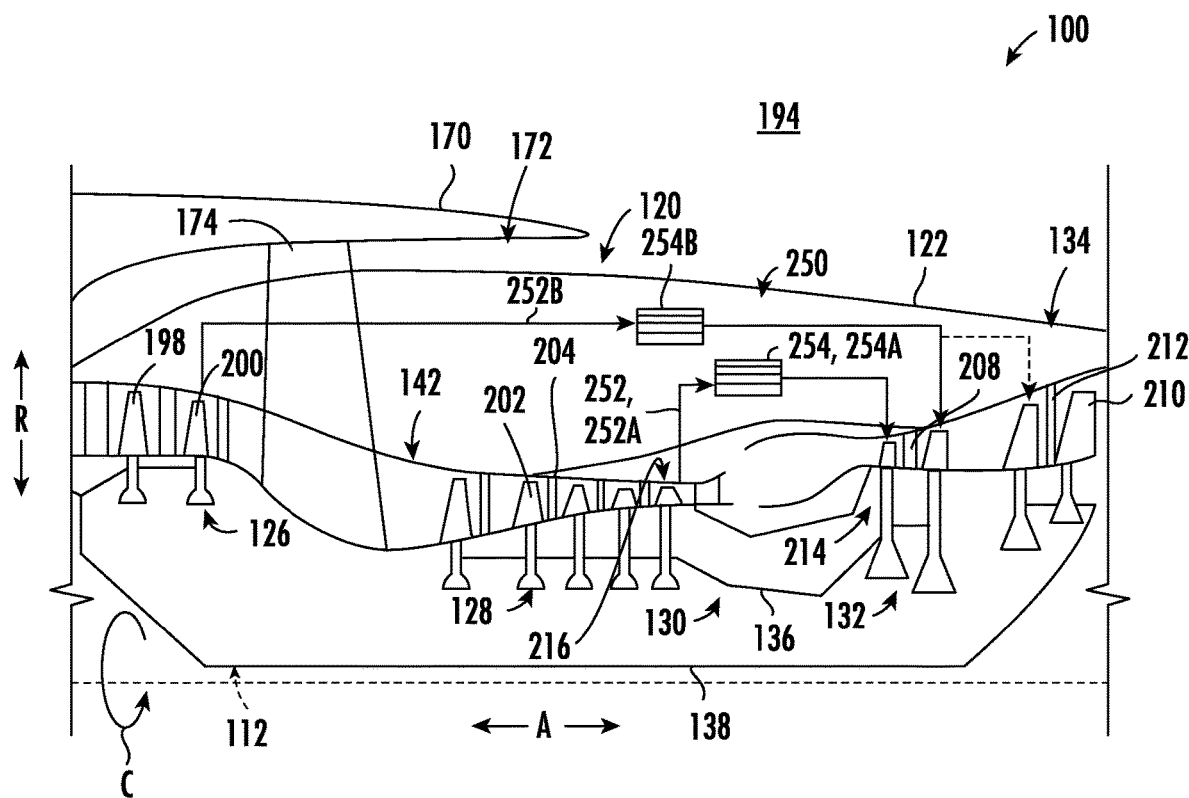
FIG. 11 is a schematic, close-up view of a gas turbine engine having a cooled cooling air system in accordance with still another exemplary aspect of the present disclosure.

More particularly, referring generally to FIGS. 9 through 11, in other exemplary embodiments, the cooled cooling air system 250 of the engine 100 may be configured in any other suitable manner. The exemplary engines 100 depicted in FIGS. 9 through 11 may be configured in a similar manner as exemplary engine 100 described above with reference to FIGS. 1 through 4, and the same or similar numbers may refer to the same or similar parts.

For example, each of the exemplary engines 100 depicted in FIGS. 9 through 11 generally includes a turbomachine 120 having an LP compressor 126, an HP compressor 128, a combustion section 130, an HP turbine 132, and an LP turbine 134 collectively defining at least in part a working gas flowpath 142 and arranged in serial flow order. The exemplary turbomachine 120 depicted additionally includes a core cowl 122, and the engine 100 includes a fan cowl 170. The engine 100 includes or defines a fan duct 172 positioned partially between the core cowl 122 and the fan cowl 170. Moreover, a bypass passage 194 is defined at least in part by the core cowl 122, the fan cowl 170, or both and extends over the turbomachine 120.

Moreover, the exemplary engines 100 depicted in FIGS. 9 to 11 additionally include a cooled cooling air system 250. The cooled cooling air system 250 generally includes a duct assembly 252 and a CCA heat exchanger 254.

However, referring particular to FIG. 9, it will be appreciated that for the exemplary embodiment depicted, the CCA heat exchanger 254 is positioned in thermal communication with the bypass passage 194, and more specifically, it is exposed to an airflow through or over the bypass passage 194. For the embodiment of FIG. 9, the CCA heat exchanger 254 is positioned on the core cowl 122. In such a manner, the CCA heat exchanger 254 may be an air-to-air CCA heat exchanger configured to exchange heat between an airflow extracted from the HP compressor 128 and the airflow through the bypass passage 194.

As is depicted in phantom, the cooled cooling air system 250 may additionally or alternatively be positioned at any other suitable location along the bypass passage 194, such as on the fan cowl 170. Further, although depicted in FIG. 9 as being positioned on the core cowl 122, in other embodiments, the CCA heat exchanger 254 may be embedded into the core cowl 122, and airflow through the bypass passage 194 may be redirected from the bypass passage 194 to the CCA heat exchanger 254.

As will be appreciated, a size of the CCA heat exchanger 254 may affect the amount of drag generated by the CCA heat exchanger 254 being positioned within or exposed to the bypass passage 194. Accordingly, sizing the cooled cooling air system 250 in accordance with the present disclosure may allow for a desired reduction in a HP compressor 128 exit area, while maintaining or even increasing a total thrust output for the engine 100, without creating an excess amount of drag on the engine 100 in the process.

Referring now particular to FIG. 10, it will be appreciated that for the exemplary embodiment depicted, the cooled cooling air system 250 is configured to receive the cooling airflow from an air source upstream of a downstream half of the HP compressor 128. In particular, for the exemplary embodiment of FIG. 10, the exemplary cooled cooling air system 250 is configured to receive the cooling airflow from a location upstream of the HP compressor 128, and more specifically, still, from the LP compressor 126. In order to allow for a relatively low pressure cooling airflow to be provided to a first stage 214 of HP turbine rotor blades 206 of the HP turbine 132, the cooled cooling air system 250 further includes a pump 299 in airflow communication with the duct assembly 252 to increase a pressure of the cooling airflow through the duct assembly 252. For the exemplary aspect depicted, the pump 299 is positioned downstream of the CCA heat exchanger 254. In such a manner, the pump 299 may be configured to increase the pressure of the cooling airflow through the duct assembly 252 after the cooling airflow has been reduced in temperature by the CCA heat exchanger 254. Such may allow for a reduction in wear on the pump 299.

Referring now particularly to FIG. 11, it will be appreciated that the cooled cooling air system 250 includes a high-pressure portion and a low-pressure portion operable in parallel. In particular, the duct assembly 252 includes a high-pressure duct assembly 252A and a low-pressure duct assembly 252B, and the CCA heat exchanger 254 includes a high-pressure CCA heat exchanger 254A and a low-pressure CCA heat exchanger 254B.

The high-pressure duct assembly 252A is in fluid communication with the HP compressor 128 at a downstream half of the high-pressure compressor and is further in fluid communication with a first stage 214 of HP turbine rotor blades 206. The high-pressure duct assembly 252A may be configured to receive a high-pressure cooling airflow from the HP compressor 128 through the high-pressure duct assembly 252A and provide such high-pressure cooling airflow to the first stage 214 of HP turbine rotor blades 206. The high-pressure CCA heat exchanger 254A may be configured to reduce a temperature of the high-pressure cooling airflow through the high-pressure duct assembly 252A at a location upstream of the first stage 214 of HP turbine rotor blades 206.

The low-pressure duct assembly 252B is in fluid communication with a location upstream of the downstream half of the high-pressure compressor 128 and is further in fluid communication with the HP turbine 132 and a location downstream of the first stage 214 of HP turbine rotor blades 206. In particular, for the embodiment depicted, the low-pressure duct assembly 252B is in fluid communication with the LP compressor 126 and a second stage (not labeled) of HP turbine rotor blades 206. The low-pressure duct assembly 252B may be configured to receive a low-pressure cooling airflow from the LP compressor 126 through the low-pressure duct assembly 252B and provide such low-pressure cooling airflow to the second stage of HP turbine rotor blades 206. The low-pressure CCA heat exchanger 254B may be configured to reduce a temperature of the low-pressure cooling airflow through the low-pressure duct assembly 252B upstream of the second stage of HP turbine rotor blades 206.

Inclusion of the exemplary cooled cooling air system 250 of FIG. 11 may reduce an amount of resources utilized by the cooled cooling air system 250 to provide a desired amount of cooling for the turbomachine 120.

Further, for the exemplary embodiment of FIG. 11, it will be appreciated that the cooled cooling air system 250 may further be configured to provide cooling to one or more stages of LP turbine rotor blades 210, and in particular to a first stage (i.e., upstream-most stage) of LP turbine rotor blades 210. Such may further allow for, e.g., the higher operating temperatures described herein.

Figure 12:
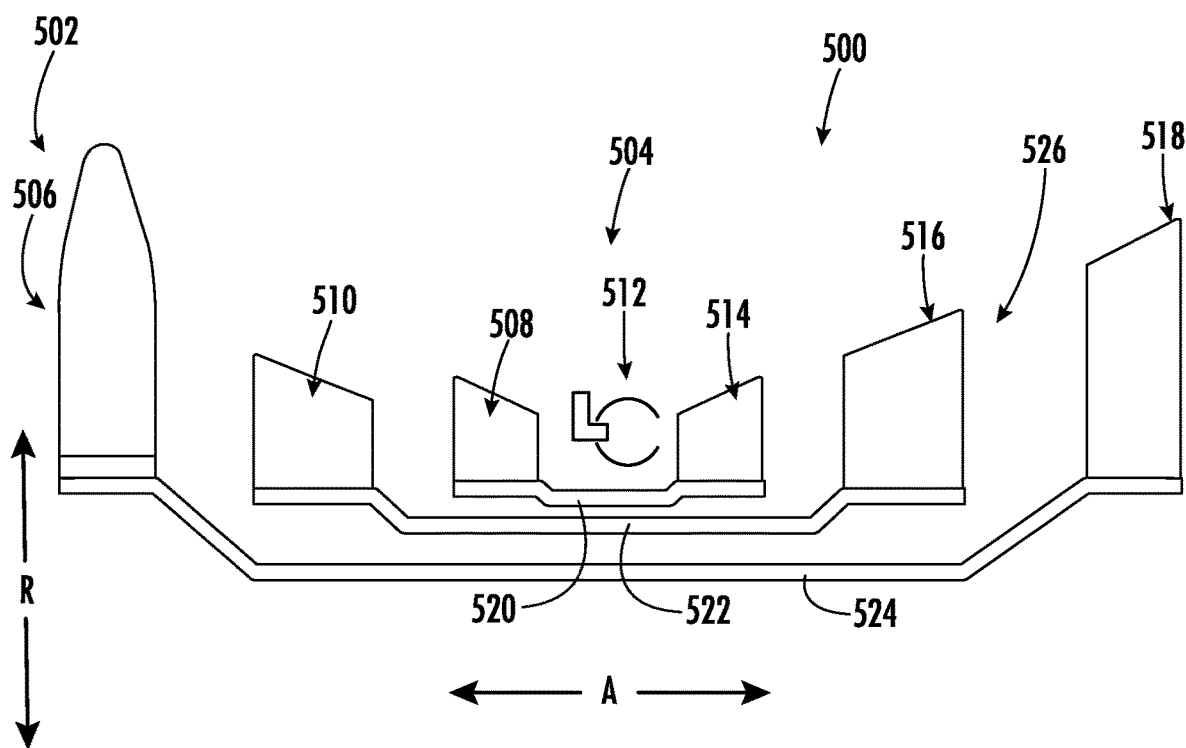
FIG. 12 is a schematic view of a turbofan engine in accordance with another exemplary aspect of the present disclosure

Reference will now be made briefly to FIG. 12. FIG. 12 provides a schematic view of an engine 500 in accordance with another exemplary embodiment of the present disclosure. The exemplary embodiment of FIG. 12 may be configured in substantially the same manner as the exemplary engine 100 described above with respect to FIGS. 1 through 4, and the same or similar reference numerals may refer to the same or similar parts. However, as will be appreciated, for the embodiment shown, the engine 500 is configured as a three-spool engine, instead of a two-spool engine.

For example, the exemplary engine 500 includes a fan section 502 and a turbomachine 504. The fan section includes a fan 506. The turbomachine includes a first compressor 508, a second compressor 510, a combustion section 512, a first turbine 514, a second turbine 516, and a third turbine 518. The first compressor 508 may be a high pressure compressor, the second compressor 510 may be a medium pressure compressor (or intermediate pressure compressor), the first turbine 514 may be a high pressure turbine, the second turbine 516 may be a medium pressure turbine (or intermediate pressure turbine), and the third turbine 518 may be a low pressure turbine. Further, the engine 500 includes a first shaft 520 extending between, and rotatable with both of, the first compressor 508 and first turbine 514; a second shaft 522 extending between, and rotatable with both of, the second compressor 510 and second turbine 516; and a third shaft 524 extending between, and rotatable with both of, the third turbine 518 and fan 506. In such a manner, it will be appreciated that the engine 500 may be referred to as a three-spool engine.

For the embodiment of FIG. 12, the term redline EGT refers to a maximum temperature of an airflow after the first stator downstream of the last stage of rotor blades of the intermediate speed turbine, e.g., at location 526 in FIG. 12 (assuming the intermediate speed turbine 516 includes a stage of stator vanes downstream of the last stage of rotor blades).

It will further be appreciated that the exemplary cooled cooling air systems 250 described hereinabove are provided by way of example only. In other exemplary embodiments, aspects of one or more of the exemplary cooled cooling air systems 250 depicted may be combined to generate still other exemplary embodiments. For example, in still other exemplary embodiments, the exemplary cooled cooling air system 250 of FIGS. 2 through 4 may not be utilized with a thermal transport bus (e.g., thermal transport bus 300), and instead may directly utilize a CCA heat exchanger 254 positioned within the fan duct 172. Similarly, in other example embodiment, the exemplary cooled cooling air systems 250 of FIGS. 9 through 11 may be utilized with a thermal transport bus (e.g., thermal transport bus 300 of FIG. 2, 4 or 5) to reject heat for the CCA heat exchanger 254. Additionally, although the exemplary cooled cooling air systems 250 depicted schematically in FIGS. 9 through 11 depict the duct assembly 252 as positioned outward of the working gas flow path 142 along the radial direction R, in other exemplary embodiments, the duct assemblies 252 may extend at least partially inward of the working gas flow path 142 along the radial direction R (see, e.g., FIG. 4). In still other exemplary embodiments, the cooled cooling air system 250 may include duct assemblies 252 positioned outward of the working gas flow path 142 along the radial direction R and inward of the working gas flow path 142 along the radial direction R (e.g., in FIG. 11, the high-pressure duct assembly 252A may be positioned inwardly of the working gas flow path 142 along the radial direction R and the low-pressure duct assembly 252B may be positioned outwardly of the working gas flow path 142 along the radial direction R).

Moreover, it will be appreciated that in still other exemplary aspects, the gas turbine engine may include additional or alternative technologies to allow the gas turbine engine to accommodate higher temperatures while maintaining or even increasing the maximum turbofan engine thrust output, as may be indicated by a reduction in the high pressure compressor exit area, without, e.g., prematurely wearing on various components within the turbomachine exposed to the working gas flowpath.

For example, in additional or alternative embodiments, a gas turbine engine may incorporate advanced materials capable of withstanding the relatively high temperatures at downstream stages of a high pressure compressor exit (e.g., at a last stage of high pressure compressor rotor blades), and downstream of the high pressure compressor (e.g., a first stage of an HP turbine, downstream stages of the HP turbine, an LP turbine, an exhaust section, etc.).

In particular, in at least certain exemplary embodiments, a gas turbine engine of the present disclosure may include an airfoil (e.g., rotor blade or stator vane) in one or more of the HP compressor, the first stage of the HP turbine, downstream stages of the HP turbine, the LP turbine, the exhaust section, or a combination thereof formed of a ceramic-matrix-composite or "CMC." As used herein, the term CMC refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide (Al2O3), silicon dioxide (SiO2), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide (Al2O3), silicon dioxide (SiO2), aluminosilicates, and mixtures thereof. Aluminosilicates can include crystalline materials such as mullite (3Al2O3 2SiO2), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

One or more of these components formed of a CMC material may include an environmental-barrier-coating or "EBC." The term EBC refers to a coating system including one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., including barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

In such a manner, it will be appreciated that the EBCs may generally be suitable for application to "components" found in the relatively high temperature environments noted above. Examples of such components can include, for example, combustor components, turbine blades, shrouds, nozzles, heat shields, and vanes.

Additionally, or alternatively still, in other exemplary embodiments, a gas turbine engine of the present disclosure may include an airfoil (e.g., rotor blade or stator vane) in one or more of an HP compressor, a first stage of an HP turbine, downstream stages of the HP turbine, an LP turbine, an exhaust section, or a combination thereof formed in part, in whole, or in some combination of materials including but not limited to titanium, nickel, and/or cobalt based superalloys (e.g., those available under the name Inconel® available from Special Metals Corporation). One or more of these materials are examples of materials suitable for use in an additive manufacturing processes.

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 4 and 8 through 11. The method includes operating the gas turbine engine at a takeoff power level, the gas turbine engine having a turbomachine with a high pressure compressor defining a high pressure compressor exit area ($A_{HPCExit}$) in square inches. The gas turbine engine further defines a redline exhaust gas temperature (EGT) in degrees Celsius, a total sea level static thrust output ($Fn_{Total}$) in pounds, and a corrected specific thrust. The corrected specific thrust is greater than or equal to 42 and less than or equal to 90, the corrected specific thrust determined as follows: $Fn_{Total} \times EGT/(A_{HPCExit}^2 \times 1000)$.

In certain exemplary aspects, operating the gas turbine engine at the takeoff power level further includes reducing a temperature of a cooling airflow provided to a high pressure turbine of the gas turbine engine with a cooled cooling air system. For example, in certain exemplary aspects, reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

As will be appreciated from the description herein, various embodiments of a gas turbine engine are provided. Certain of these embodiments may be an unducted, single rotor gas turbine engine (see FIG. 1), a turboprop engine, or a ducted turbofan engine (see FIG. 8). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the FIGS.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 3.2 to 12 or within a range of 4.5 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 6 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the compressor section having a high pressure compressor defining a high pressure compressor exit area ($A_{HPCExit}$) in square inches; wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific determined as follows: $Fn_{Total} \times EGT/(A_{HPCExit}^2 \times 1000)$.

The gas turbine engine of the preceding clauses wherein the corrected specific thrust is from 42 to 90, such as from 45 to 80, such as from 50 to 80.

The gas turbine engine of the preceding clauses, wherein the EGT is greater than 1000 degrees Celsius and less than 1300 degrees Celsius.

The gas turbine engine of any preceding clause, wherein the EGT is greater than 1100 degree Celsius and less than 1250 degrees Celsius.

The gas turbine engine of any preceding clause, wherein the EGT is greater than 1150 degree Celsius and less than 1250 degrees Celsius.

The gas turbine engine of any preceding clause, wherein the EGT is greater than 1000 degree Celsius and less than 1300 degrees Celsius, and wherein the corrected specific thrust is greater than or equal to 45.

The gas turbine engine of any preceding clause, wherein the EGT is greater than 1000 degree Celsius and less than 1300 degrees Celsius, and wherein the corrected specific thrust is greater than or equal to 50.

The gas turbine engine of any preceding clause, wherein the turbine section comprises a high pressure turbine having a first stage of high pressure turbine rotor blades, and wherein the gas turbine engine further comprises: a cooled cooling air system in fluid communication with the first stage of high pressure turbine rotor blades.

The gas turbine engine of one or more of the preceding clause, wherein the cooled cooling air system is further in fluid communication with the high pressure compressor for receiving an airflow from the high pressure compressor, and wherein the cooled cooling air system further comprises a heat exchanger in thermal communication with the airflow for cooling the airflow.

The gas turbine engine of any preceding clause, wherein when the gas turbine engine is operated at a takeoff power level, the cooled cooling air system is configured to provide a temperature reduction of a cooling airflow equal to at least 15% of the EGT and up to 45% of the EGT.

The gas turbine engine of any preceding clause, wherein when the gas turbine engine is operated at a takeoff power level, the cooled cooling air system is configured to receive between 2.5% and 35% of an airflow through a working gas flowpath of the turbomachine at an inlet to a compressor of the compressor section.

The gas turbine engine of any preceding clause, further comprising a primary fan driven by the turbomachine.

The gas turbine engine of any preceding clause, further comprising an inlet duct downstream of the primary fan and upstream of the compressor section of the turbomachine; and a secondary fan located within the inlet duct.

The gas turbine engine of any preceding clause, wherein the gas turbine engine defines a bypass passage over the turbomachine, and wherein the gas turbine engine defines a third stream extending from a location downstream of the secondary fan to the bypass passage.

The gas turbine engine of any preceding clause, wherein the secondary fan is a single stage secondary fan.

A method of operating a gas turbine engine, comprising: operating the gas turbine engine at a takeoff power level, the gas turbine engine having a turbomachine with a high pressure compressor defining a high pressure compressor exit area ($A_{HPCExit}$) in square inches, the gas turbine engine defining a redline exhaust gas temperature (EGT) in degrees Celsius, a total sea level static thrust output ($Fn_{Total}$) in pounds, and a corrected specific thrust; wherein the corrected specific thrust is greater than or equal to 42 and less than or equal to 90, the corrected specific determined as follows: $Fn_{Total} \times EGT/(A_{HPCExit}^2 \times 1000)$.

The method of any preceding clause, wherein the EGT defined by the gas turbine engine is greater than 1000 degree Celsius and less than 1300 degrees Celsius.

The method of any preceding clause, wherein the EGT defined by the gas turbine engine is greater than 1100 degree Celsius and less than 1300 degrees Celsius.

The method of any preceding clause, wherein the EGT defined by the gas turbine engine is greater than 1000 degree Celsius and less than 1300 degrees Celsius, and wherein the corrected specific thrust defined by the gas turbine engine is greater than or equal to 45.

The method of any preceding clause, wherein operating the gas turbine engine at the takeoff power level further comprises reducing a temperature of a cooling airflow provided to a high pressure turbine of the gas turbine engine with a cooled cooling air system.

The method of any preceding clause, wherein reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

The gas turbine engine of any preceding clause, wherein the cooled cooling air systems includes a thermal bus cooled cooling air system (see, e.g., FIGS. 4 and 5).

The gas turbine engine of any preceding clause, wherein the cooled cooling air systems includes a dedicated heat exchanger cooled cooling air system (i.e., a cooled cooling air system including a heat exchanger dedicated to the cooled cooling air system).

The gas turbine engine of any preceding clause, wherein the cooled cooling air systems includes a bypass heat exchanger cooled cooling air system having a heat sink heat exchanger thermally coupled to an airflow through a bypass passage (see, e.g., FIG. 9).

The gas turbine engine of any preceding clause, wherein the cooled cooling air systems includes an air-to-air cooled cooling air system (a cooled cooling air system having a heat sink heat exchanger configured to transfer heat to an airflow; see, e.g., FIG. 9.

The gas turbine engine of any preceding clause, wherein the cooled cooling air systems includes an oil-to-air cooled cooling air system (a cooled cooling air system having a heat sink heat exchanger configured to transfer heat to an oil flow).

The gas turbine engine of any preceding clause, wherein the cooled cooling air systems includes a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4). or a combination thereof. In one or more of the exemplary cooled cooling air systems described herein, the The gas turbine engine of any preceding clause, wherein the cooled cooling air systems is configured to receive the cooling air from a downstream end of a high pressure compressor.

The gas turbine engine of any preceding clause, wherein the cooled cooling air systems is configured to receive the cooling air from an upstream end of the high pressure compressor.

The gas turbine engine of any preceding clause, wherein the cooled cooling air systems is configured to receive the cooling air from a downstream end of a low pressure compressor.

The gas turbine engine of any preceding clause, wherein the cooled cooling air systems is configured to receive the cooling air from an upstream end of the low pressure compressor.

The gas turbine engine of any preceding clause, wherein the cooled cooling air systems is configured to receive the cooling air from a location between compressors.

The gas turbine engine of any preceding clause, wherein the cooled cooling air systems is configured to receive the cooling air from a bypass passage.

We claim:

1. A gas turbine engine comprising:
a turbomachine comprising a compressor section, a combustion section, and a turbine section arranged in serial flow order, the compressor section having a high pressure compressor defining a high pressure compressor exit area ($A_{HPCExit}$) in square inches;
wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 80, the corrected specific thrust determined as follows: $Fn_{Total} \times EGT/(A_{HPCExit}^2 \times 1000)$.

2. The gas turbine engine of claim 1, wherein the EGT is greater than 1000 degrees Celsius and less than 1300 degrees Celsius.

3. The gas turbine engine of claim 1, wherein the EGT is greater than 1100 degree Celsius and less than 1250 degrees Celsius.

4. The gas turbine engine of claim 1, wherein the EGT is greater than 1150 degree Celsius and less than 1250 degrees Celsius.

5. The gas turbine engine of claim 1, wherein the EGT is greater than 1000 degree Celsius and less than 1300 degrees Celsius, and wherein the corrected specific thrust is greater than or equal to 45.

6. The gas turbine engine of claim 1, wherein the EGT is greater than 1000 degree Celsius and less than 1300 degrees Celsius, and wherein the corrected specific thrust is greater than or equal to 50.

7. The gas turbine engine of claim 1, wherein the turbine section comprises a high pressure turbine having a first stage of high pressure turbine rotor blades, and wherein the gas turbine engine further comprises:
a cooled cooling air system in fluid communication with the first stage of high pressure turbine rotor blades.

8. The gas turbine engine of claim 7, wherein the cooled cooling air system is further in fluid communication with the high pressure compressor for receiving an airflow from the high pressure compressor, and wherein the cooled cooling air system further comprises a heat exchanger in thermal communication with the airflow for cooling the airflow.

9. The gas turbine engine of claim 7, wherein when the gas turbine engine is operated at a takeoff power level, the cooled cooling air system is configured to provide a temperature reduction of a cooling airflow equal to at least 15% of the EGT and up to 45% of the EGT.

10. The gas turbine engine of claim 7, wherein when the gas turbine engine is operated at a takeoff power level, the cooled cooling air system is configured to receive between 2.5% and 35% of an airflow through a working gas flowpath of the turbomachine at an inlet to a compressor of the compressor section.

11. The gas turbine engine of claim 1, further comprising a primary fan driven by the turbomachine.

12. The gas turbine engine of claim 11, further comprising an inlet duct downstream of the primary fan and upstream of the compressor section of the turbomachine; and
a secondary fan located within the inlet duct.

13. The gas turbine engine of claim 12, wherein the gas turbine engine defines a bypass passage over the turbomachine, and wherein the gas turbine engine defines a third stream extending from a location downstream of the secondary fan to the bypass passage.

14. The gas turbine engine of claim 12, wherein the secondary fan is a single stage secondary fan.

15. A method of operating a gas turbine engine, comprising:
operating the gas turbine engine at a takeoff power level, the gas turbine engine having a turbomachine with a high pressure compressor defining a high pressure compressor exit area ($A_{HPCExit}$) in square inches, the gas turbine engine defining a redline exhaust gas temperature (EGT) in degrees Celsius, a total sea level static thrust output ($Fn_{Total}$) in pounds, and a corrected specific thrust;
wherein the corrected specific thrust is greater than or equal to 42 and less than or equal to 80, the corrected specific thrust determined as follows: $Fn_{Total} \times EGT/(A_{HPCExit}^2 \times 1000)$.

16. The method of claim 15, wherein the EGT defined by the gas turbine engine is greater than 1000 degree Celsius and less than 1300 degrees Celsius.

17. The method of claim 15, wherein the EGT defined by the gas turbine engine is greater than 1100 degree Celsius and less than 1300 degrees Celsius.

18. The method of claim 15, wherein the EGT defined by the gas turbine engine is greater than 1000 degree Celsius and less than 1300 degrees Celsius, and wherein the corrected specific thrust defined by the gas turbine engine is greater than or equal to 45.

19. The method of claim 15, wherein operating the gas turbine engine at the takeoff power level further comprises reducing a temperature of a cooling airflow provided to a high pressure turbine of the gas turbine engine with a cooled cooling air system.

20. The method of claim 19, wherein reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

* * * * *